United States Patent
Endo

(10) Patent No.: US 8,305,858 B2
(45) Date of Patent: Nov. 6, 2012

(54) VARIABLE DELAY CIRCUIT, RECORDING APPARATUS, AND DELAY AMOUNT CALIBRATION METHOD

(75) Inventor: Masaki Endo, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 13/167,800

(22) Filed: Jun. 24, 2011

(65) Prior Publication Data

US 2012/0002528 A1    Jan. 5, 2012

(30) Foreign Application Priority Data

Jul. 1, 2010   (JP) ................................ P2010-150798

(51) Int. Cl.
*G11B 7/00* (2006.01)
*H03H 11/26* (2006.01)
(52) U.S. Cl. ................. 369/59.12; 369/124.14; 327/276
(58) Field of Classification Search ............... 369/47.51, 369/59.11, 59.12, 59.1, 59.17, 59.19, 59.2, 369/59.24, 124.04, 124.14; 327/158, 237, 327/231, 160, 262, 276
See application file for complete search history.

(56) References Cited

U.S. PATENT DOCUMENTS

| 6,731,144 | B2 | 5/2004 | Endo | |
|---|---|---|---|---|
| 7,102,970 | B2 * | 9/2006 | Ueki | 369/47.51 |
| 7,574,633 | B2 * | 8/2009 | Sato et al. | 714/700 |

FOREIGN PATENT DOCUMENTS

JP   2000-134072 A   5/2000
JP   2002-324369 A   11/2002

* cited by examiner

*Primary Examiner* — Nabil Hindi
(74) *Attorney, Agent, or Firm* — Lerner, David, Littenberg, Krumholz & Mentlik, LLP

(57) ABSTRACT

Provided are a variable delay circuit, a recording apparatus, and a delay amount calibration method. The variable delay circuit includes a delay line in which a delay amount is variably set, a delay setting unit that performs delay setting of the delay line using a unit delay control value, in a calibration period, overlaps a test pulse with the input signal, and generates a comparison pulse, and a unit delay determining unit that sets the delay of the unit delay amount in the delay line by providing the unit delay control value to the delay setting unit in the calibration period, determines the unit delay control value equivalent to the unit delay amount based on a phase comparison result between the comparison pulse and the test pulse, and provides, to the delay setting unit, the determined unit delay control value as the unit delay control value of a calibration result.

14 Claims, 22 Drawing Sheets

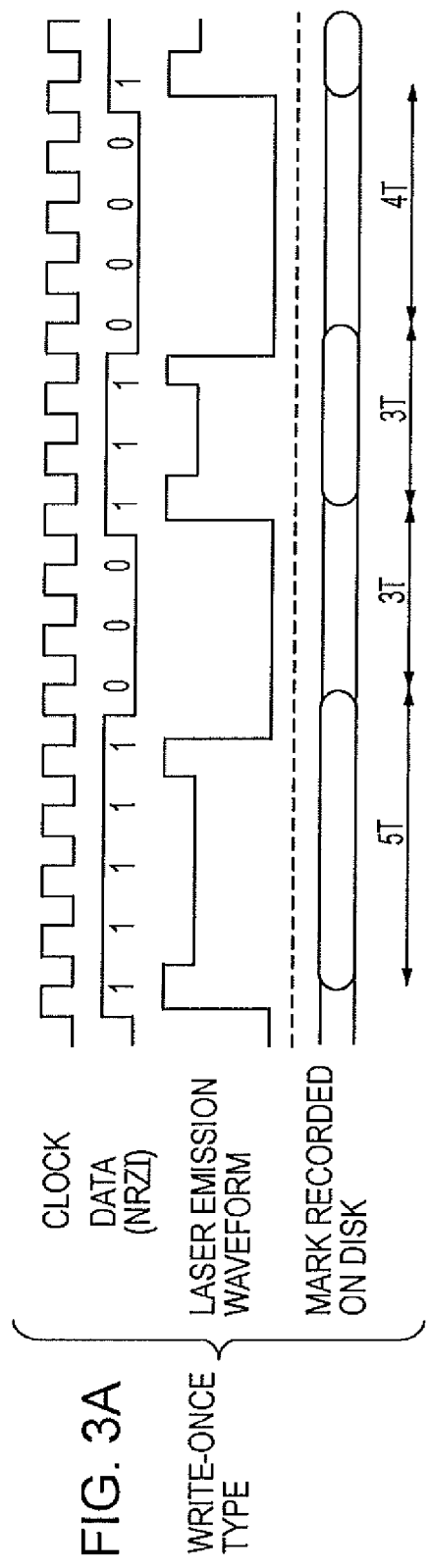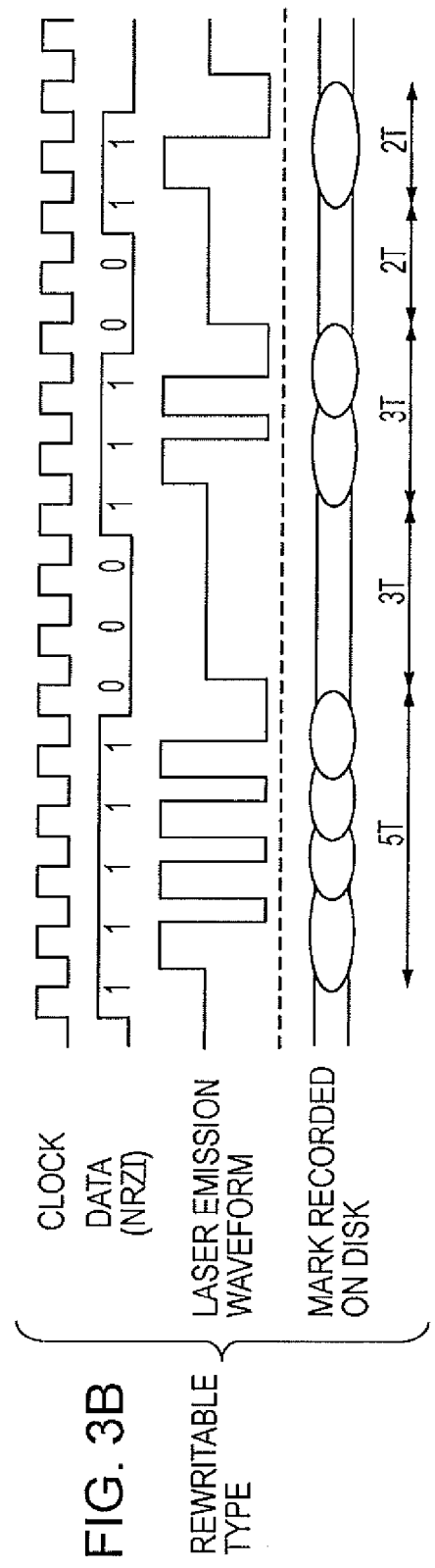

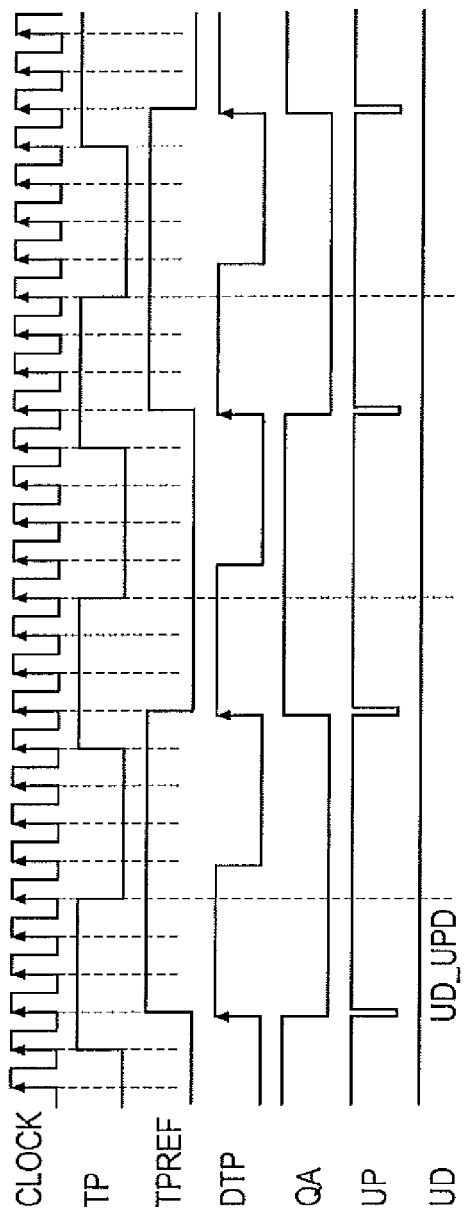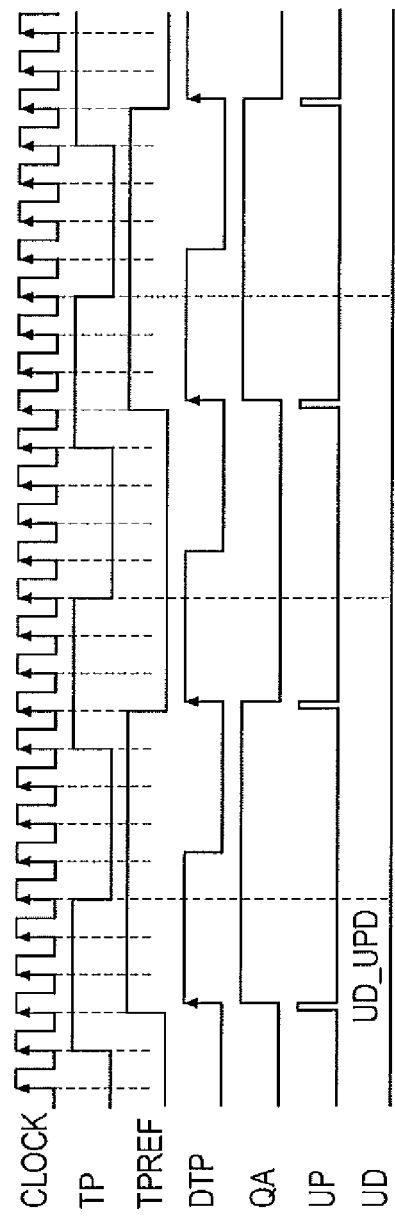

VARIABLE DELAY CIRCUIT, RECORDING APPARATUS, AND DELAY AMOUNT CALIBRATION METHOD

CROSS-REFERENCE TO RELATED APPLICATION

The present application claims priority from Japanese Patent Application No. JP 2010-150798 filed in the Japanese Patent Office on Jul. 1, 2010, the entire content of which is incorporated herein by reference.

BACKGROUND

The present disclosure relates to a variable delay circuit, a recording apparatus, and a delay amount calibration method, and more particularly, to an appropriate technique for delay amount setting of a delay line with respect to an edge pulse used in generation of a recording driving pulse of the recording apparatus.

In order to stably perform recording by maintaining recording characteristics in an optical disc using a semiconductor laser, adjustment of a laser driving pulse driving a recording laser is performed. For example, adjustment of a prescribed pulse edge timing of the laser driving pulse is performed.

Therefore, in a generation circuitry of the laser driving pulse, an edge pulse indicating each edge timing constituting the laser driving pulse is input to the respective delay line. By changing a delay amount of each of the delay lines, each of the edge timings is adjusted, and the laser driving pulse is generated by operations using the adjusted edge timings.

SUMMARY

As for a circuit generating the laser driving pulse, it is necessary for the delay amount of the delay line to be accurately set. For example, the delay line is configured as a variable delay circuit in such a manner that delay elements having a prescribed delay time are connected in series in a plurality of stages to control the number of stages through which an input signal passes. Here, a delay amount of each of the delay elements varies depending on temperature conditions. As for the variation, when an appropriate number of delay stages is not adjusted, and a prescribed delay amount is not obtained with respect to the input signal (for example, edge pulse), the laser driving pulse is not optimized.

Due to this, a calibration circuit for calibrating a delay amount setting by the delay line, for example, a DLL (Delay Locked Loop) may be mounted, as disclosed in Japanese Unexamined Patent Application Publication No. 2002-324369 and Japanese Unexamined Patent Application Publication No. 2000-134072. Meanwhile, simplification of circuit configuration and delay amount setting with high accuracy may be necessary.

It is desirable that the variable delay circuit used in the generation circuitry of the laser driving pulse may perform delay amount calibration with high accuracy. In addition, it is desirable that a significant increase in a scale of the circuit configuration may be prevented.

According to an embodiment of the present disclosure, there is provided a variable delay circuit, including: a delay line in which a delay amount is variably set; a delay setting unit that performs a delay setting of the delay line using a unit delay control value for executing delay of the delay amount to be given for an input signal to the delay line and delay of a predetermined unit delay amount in the delay line; a pulse generator that, in a calibration period, overlaps a test pulse with the input signal, and generates a comparison pulse having the unit delay amount with respect to the test pulse; and a unit delay determining unit that sets the delay of the unit delay amount in the delay line by providing the unit delay control value to the delay setting unit in the calibration period, determines the unit delay control value equivalent to the unit delay amount based on a phase comparison result between the comparison pulse and the test pulse in which the unit delay amount is applied through the delay line, and provides, to the delay setting unit, the determined unit delay control value as the unit delay control value of a calibration result.

Further, the unit delay determining unit may determine the unit delay control value based on a value of an up/down counter in which a count value goes up or down in accordance with the phase comparison result.

Also, the delay line in which delay elements are connected in series in a plurality of stages may delay the input signal by the number of the stages of the delay element provided in the delay setting unit.

Also, the delay setting unit may set the number of delay stages of the delay line at the time other than the calibration period based on a calculation result obtained using the number of unit delay stages for the delay of the predetermined unit delay amount provided as the unit delay control value, and also using the delay amount to be given for the input signal, and the unit delay determining unit may determine the number of unit delay stages as the unit delay control value based on the value of the up/down counter in which the count value goes up or down in accordance with the phase comparison result, and provide the determined number of the unit delay stages to the delay setting unit.

Alternatively, the delay setting unit may perform setting of a power supply voltage of the delay element based on the unit delay control value, and setting of the number of the delay stages of the delay line in accordance with a delay amount to be given for the input signal, and the unit delay determining unit may determine the unit delay control value for the setting of the power supply voltage of the delay element based on the value of the up/down counter in which the count value goes up or down in accordance with the phase comparison result, and provide the determined unit delay control value to the delay setting unit.

Also, the up/down counter may include a sub-counter in which the count value goes up or down in accordance with the phase comparison result, and a main counter in which the count value goes up or down to a setting maximum value and a setting minimum value of the sub-counter.

According to another embodiment of the present disclosure, there is provided a head unit that performs information recording by performing a recording operation depending on a recording driving pulse with respect to a recording medium; and a recording driving pulse generation unit that generates the recording driving pulse based on recording data.

Here, the recording driving pulse generation unit may include: an edge pulse generator that outputs one or a plurality of edge pluses indicating one or a plurality of edge timings to be a timing adjustment target when the recording driving pulse depending on the recording data is generated, overlaps a test pulse with the edge pulse in the calibration period with respect to each of the edge pulses, and generates a comparison pulse having a unit delay amount with respect to each test pulse; a plurality of delay lines that are installed to correspond to each of the edge pulses, each of the delay lines variably setting a delay amount to be given to an input edge pulse; a plurality of delay setting units that are installed to correspond to each of the delay lines, and performs a delay setting with respect to a corresponding delay line using a unit delay control value for performing delay of the delay amount to be given to the input edge pulse and delay of a predetermined unit delay amount to the corresponding delay line; a light pulse generator that generates the recording driving pulse using each of the edge pulses having passed through each of the delay lines; and a plurality of unit delay determining units that are installed to correspond to each of the delay lines, each of the unit delay determining units setting the delay of the unit delay amount to the corresponding delay line by giving the unit delay control value to a corresponding delay setting unit in the calibration period, determining the unit delay control value equivalent to the unit delay amount based on a phase comparison result between the comparison pulse and the test pulse in which the unit delay amount is applied through a corresponding delay line, and supplying, to the corresponding delay setting unit, the determined unit delay control value as the unit delay control value of a calibration result.

Also, each of the unit delay determining units may determine the unit delay control value based on a value of an up/down counter in which a count value goes up or down in accordance with the phase comparison result.

Also, each of the delay lines in which delay elements are connected in series in a plurality of stages may delay an input signal by the number of stages of the delay element set in each of the delay setting units.

Also, each of the delay setting units may set the number of delay stages of a corresponding delay line at the time other than the calibration period based on a calculation result obtained using the number of unit delay stages for the delay of the predetermined unit delay amount provided as the unit delay control value, and also using the delay amount to be given to a corresponding edge pulse, and each of the unit delay determining units may determine the number of unit delay stages as the unit delay control value based on the value of the up/down counter in which the count value goes up or down in accordance with the phase comparison result, and provide the determined number of the unit delay stages to a corresponding delay setting unit.

Alternatively, each of the delay setting units may perform setting of a power supply voltage of the delay element of a corresponding delay line based on the unit delay control value, and setting of the number of delay stages of a corresponding delay line in accordance with the delay amount to be given to a corresponding edge pulse, and each of the unit delay determining units may determine the unit delay control value for the setting of the power supply voltage of the delay element based on the value of the up/down counter in which the count value goes up or down in accordance with the phase comparison result, and provide the determined unit delay control value to a corresponding delay setting unit.

Also, the up/down counter may include a sub-counter in which the count value goes up or down in accordance with the phase comparison result, and a main counter in which the count value goes up or down to a setting maximum value and a setting minimum value of the sub-counter.

Also, the head unit may be an optical pickup unit, and performs the information recording by performing the recording operation with respect to an optical recording medium as a laser output in accordance with the recording driving pulse, and the recording driving pulse generation unit may generate a laser driving pulse as the recording driving pulse based on the recording data.

Also, the recording data may be recording data as a run length limited code, and may further include a mask signal generation unit that generates a mask signal so that a period during which a run length of the recording data becomes a prescribed length or longer is the calibration period, and the edge pulse generator may overlap the test pulse with the edge pulse in accordance with the mask signal to thereby output the overlapped pulse.

Also, in the calibration period in accordance with the mask signal, a test pulse removal circuit for removing the test pulse from the edge pulse input through the delay line may be provided in the light pulse generator.

According to still another embodiment of the present disclosure, there is provided a delay amount calibration method, including: overlapping a test pulse with the input signal in a calibration period after setting the delay of the unit delay amount in the delay line based on the unit delay control value, and generating a comparison pulse having the unit delay amount with respect to the test pulse; performing a phase comparison between the comparison pulse and the test pulse in which the unit delay amount is applied through the delay line; and determining the unit delay control value equivalent to the unit delay amount based on a result of the phase comparison, and enabling the determined unit delay control value as the unit delay control value of a calibration result to be used in subsequent setting of the delay amount of the delay line.

In the present disclosure, a delay amount calibration of the delay line may be performed using the delay line itself delaying the input signal (for example, edge pulse).

That is, in a predetermined calibration period, the delay line set in the unit delay amount by overlapping the test pulse with the input signal may pass through. A phase comparison between the test pulse delayed in this delay line and a reference pulse having the unit delay amount with respect to the test pulse may be performed. By a result of the phase comparison, the unit delay control value may be calibrated. Since the delay setting (for example, setting of the number of delay stages or setting of the power supply voltage of the delay element) is performed on the delay line using the delay amount to be given for the input signal and the unit delay control value, a delay setting with high accuracy may be performed by successively calibrating the unit delay control value.

According to the embodiments of the present disclosure, the delay amount calibration of the delay line is performed using the delay line itself delaying the input signal (edge pulse), so that it is possible to perform the delay amount calibration with high accuracy. In particular, the delay amount calibration is performed using the delay line for each of the edge pulses, so that the delay amount calibration absorbing variation of an element between the delay lines may be performed. Thus, in the recording apparatus, a recording driving pulse with high accuracy may be generated in accordance with temperature conditions, and the like, thereby stabilizing recording characteristics.

In addition, a calibration delay line may not be provided, so that an increase in a circuit scale may be prevented.

BRIEF DESCRIPTION OF THE DRAWINGS

FIGS. 3A and 3B are explanatory diagrams of a laser emission light waveform according to an embodiment of the present disclosure;

FIGS. 9A and 9B are explanatory diagrams of a DLL operation;

DETAILED DESCRIPTION OF EMBODIMENTS

Figure 1:
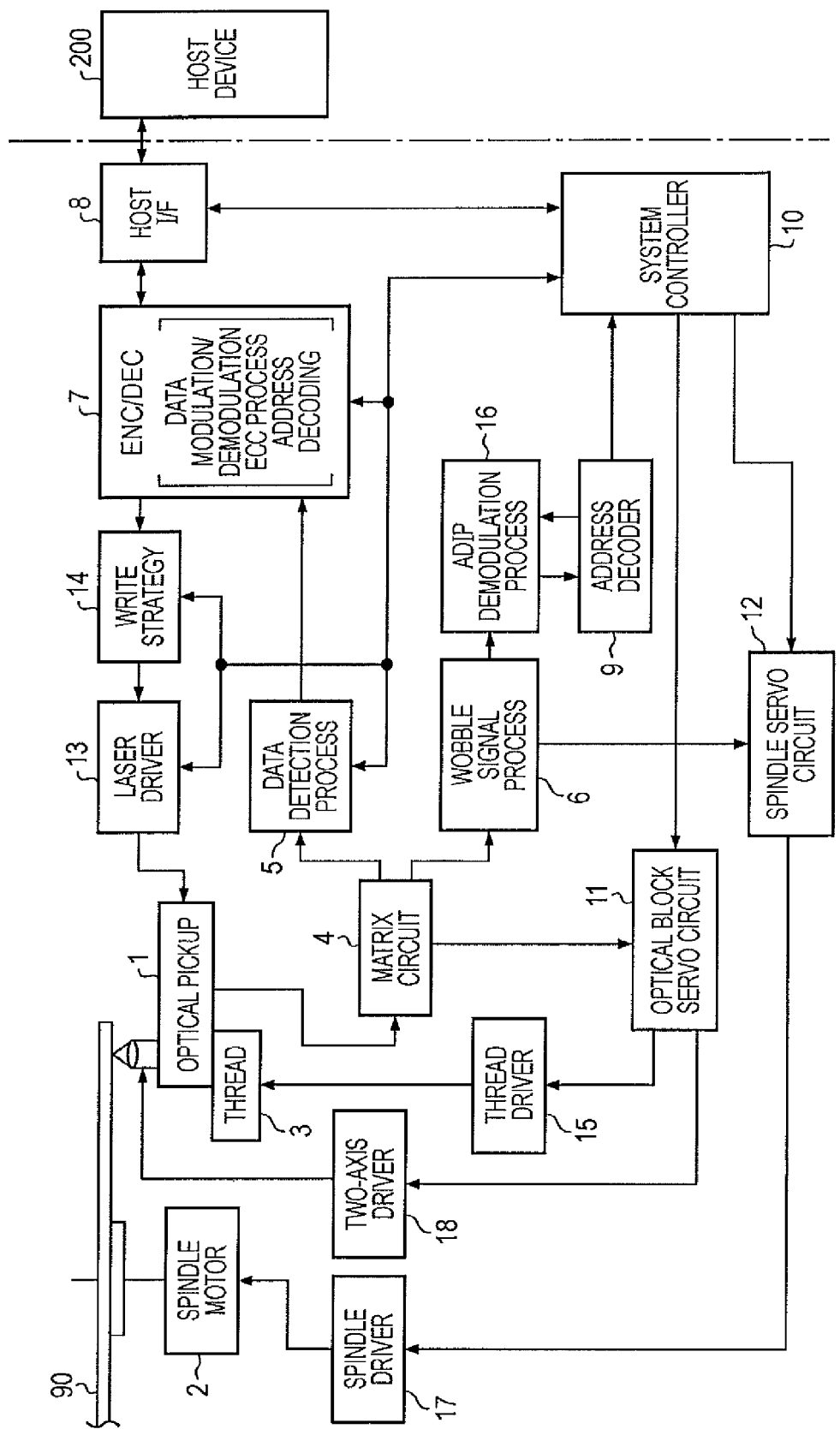
FIG. 1 is a block diagram of a disc drive device according to an embodiment of the present disclosure.

Hereinafter, a variable delay circuit, a recording apparatus, and a delay amount calibration method according to embodiments of the present disclosure will be described. Here, as an example of the recording apparatus, a disc drive apparatus performing recording and reproducing with respect to an optical disc may be given. In addition, an example in which the variable delay circuit of the present disclosure is mounted in a write strategy unit of the disc drive apparatus will be given. The descriptions will be made in the following order:

1. Configuration of disc drive apparatus
2. Generation of laser driving pulse
3. Configuration of comparison example and DLL
4. First embodiment
5. Second embodiment
6. Third embodiment
7. Fourth embodiment
8. Modified example

1. Configuration of Disc Drive Apparatus

A configuration of a disc drive apparatus according to an embodiment of the present disclosure will be described in detail with reference to FIG. 1.

The disc drive apparatus according to the present embodiment may perform reproducing or recording with respect to a Compact Disc (CD), a Digital Versatile Disc (DVD), a Blu-ray Disc (registered trademark), or a reproduction exclusive disc as a next-generation disc or the like or a recordable disc (write-one-disc or re-writable disc).

For example, a recordable Blu-ray disc performs recording or reproducing of a phase change mark or a pigment change mark under a condition of a combination between a laser (so-called blue laser) with a wavelength of 405 nm and an objective lens with NA of 0.85, and the recording and reproducing are performed using a track pitch of 0.32 μm, a linear density of 0.12 μm/bit, and a data block of 64 KB (kilobytes) as a single recording and reproducing unit (RUB: Recording Unit Block).

In addition, on the disc exclusive for reproduction, data exclusive for reproduction is recorded by an embossed pit with a depth of about λ/4. Similarly, the track pitch is 0.32 μm, and a linear density is 0.12 μm/bit. The data block of 64 KB is used as a single reproducing unit (RUB).

The RUB, that is, the recording and reproducing unit becomes a total of 498 frames generated by adding a link area of 1 frame, for example, before and after an ECC block (cluster) of 156 symbols×496 frames.

In addition, in the case of a recordable disc, a meandering groove (wobbling) is formed on the recordable disc, and the wobbling groove is a recording and reproducing track. Wobbling of the groove contains so-called ADIP (Address in Pregroove) data. Consequently, it is possible to obtain an address on the disc by detecting wobbling information of the groove.

In the case of a recordable disc, a recording mark due to a phase change mark is recorded on the track formed by the wobbling groove, however, the phase change mark is recorded in a linear density of 0.12 μm/bit and 0.08 μm/ch bit by an RLL (1, 7) PP modulation scheme (RLL; Run Length Limited, PP: Parity preserve/Prohibit rmtr (repeated minimum transition runlength)) and the like.

When a channel clock cycle is 'T', a mark length is from 2 T to 8 T.

In the case of a reproduction exclusive disc, a groove is not formed, however, similarly, data modulated in the RLL (1, 7) PP modulation scheme is recorded as an embossed pit string.

When being loaded onto the disc drive device, an optical disc 90 such as a Blu-ray disc or DVD is stacked on a turntable not shown, and rotatably driven at a constant linear velocity (CLV) or a constant angular velocity (CAV) by a spindle motor 2 when recording/reproducing.

In addition, mark information recorded on a track of the optical disc 90 is read by an optical pickup 1 (optical head) when reproducing.

In addition, when recording data on the optical disc 90, user data is recorded, as the phase change mark or the pigment change mark, on the track of the optical disc 90 by the optical pickup 1.

In addition, for example, physical information of the disc, and the like are recorded, as management information exclusive for reproduction, on an inner circumferential area 91 of the optical disc 90 by the embossed pit or the wobbling groove, however, reading of this information is performed by the pickup 1.

In addition, reading of ADIP information embedded as wobbling of a groove track of the disc 90 is performed with respect to the optical disc 90 by the optical pickup 1.

The optical pickup 1 includes a laser diode as a laser light source, a photodetector for detecting the reflected light, an objective lens serving as an output end, and an optical system which radiates the laser light to a disc surface through the objective lens, and guides the reflected light from the disc to the photodetector.

The objective lens within the pickup 1 is held to be movable in a tracking direction and focus direction by a two-axis mechanism.

In addition, the entire pickup 1 is movable in a disc radial direction by a thread mechanism 3.

In addition, a driving current flows in the laser diode of the pickup 1 by the laser driver 13, so that laser light is emitted.

Reflected light from the disc 90 is detected by the photodetector, and converted to an electric signal equivalent to an amount of received light to thereby be provided to the matrix circuit 4.

The matrix circuit 4 includes a current-voltage conversion circuit, which converts an output current from a plurality of photodetectors into respective voltage, a matrix calculation/amplification circuit, and the like, and generates signals on the basis of a matrix calculation process.

For example, the matrix circuit 4 generates a reproducing information signal (RF signal) equivalent to reproducing data, a focus error signal for servo control, a tracking error signal, and the like.

In addition, a signal relating to the wobbling of the groove, that is, a push-pull signal as a signal detecting the wobbling is generated.

The reproducing information signal output from the matrix circuit 4 is provided to a data detection processing unit 5, the focus error signal and the tracking error signal are provided to an optical block servo circuit 11, and the push-pull signal is provided to a wobble signal processing circuit 15.

The data detection processing unit 5 performs a binarization processing of the reproducing information signal.

For example, in the data detection processing unit 5, an A/D conversion process of an RF signal, a reproducing clock generation process by PLL, a PR (Partial Response) equalization process, a Viterbi decoding (maximum likelihood decoding), and the like are performed. A binary data string is obtained by a Partial Response Maximum Likelihood process (PRML detection scheme).

In addition, the data detection processing unit 5 provides, to an encoding/decoding unit 7 of a post-stage, the binary data string as information read from the optical disc 90.

The encoding/decoding unit 7 performs a demodulation process of reproducing data when reproducing, and a modulation process of recoding data when recording. That is, when reproducing, data demodulation, de-interleaving, ECC decoding, address decoding, and the like are performed, and when recording, ECC encoding, interleaving, data modulation, and the like are performed.

When reproducing, the binary data string decoded in the data detection processing unit 5 is provided to the encoding/decoding unit 7. In the encoding/decoding unit 7, a demodulation process is performed with respect to the binary data string, and the reproducing data from the optical disc 90 is obtained. That is, for example, a run length limited code modulation such as RLL (1, 7) PP modulation is performed, so that a demodulation process and an ECC decoding process performing error correction are performed with respect to data recorded on the optical disc 90, thereby obtaining the reproducing data from the optical disc 90.

Data decoded up to the reproducing data in the encoding/decoding unit 7 is transmitted to a host interface 8, and transmitted to a host device 200 based on instructions of a system controller 10. As examples of the host device 200, for example, a computer device, Audio-Visual (AV) system equipment, and the like are given.

When recording/reproducing with respect to the optical disc 90, a process of the ADIP information is performed.

That is, as the signal relating to the wobbling of the groove, the push-pull signal output from the matrix circuit 4 becomes wobble data digitized in the wobble signal processing circuit 6. In addition, clock synchronized with the push-pull signal by the PLL processing is generated.

The wobble data is demodulated to a data stream constituting an ADIP address in the ADIP demodulation circuit 16 to thereby be provided to the address decoder 9.

The address decoder 9 performs decoding on the provided data to obtain an address value, and provided to the system controller 10.

When recording, the recording data is transmitted from the host device 200, however, the recording data is provided to the encoding/decoding unit 7 through the host interface 8.

In this case, the encoding/decoding unit 7 performs error correction code addition (ECC encoding), interleaving, sub code addition, and the like as the encoding of the recording data. In addition, the run length limited code modulation such as RLL (1-7) PP scheme or the like is performed in respect to data being subjected to these processes.

The recoding data processed in the encoding/decoding unit 7 is provided to the write strategy unit 14. In the write strategy unit 14, waveform adjustment of the laser driving pulse is performed, as a recording compensation process, with respect to characteristics of a recording layer, a spot shape of laser light, a recording linear velocity, and the like. Next, the laser driving pulse is output to the laser driver 13.

Although described in detail later, in this example case, an erase bias timing (EB_TIM) and a peak pulse timing (PP_TIM) are generated as the laser driving pulse particularly in the write strategy unit 14, and the generated timing is output to the laser driver 13. For the generation of the erase bias timing (EB_TIM) and the peak pulse timing (PP_TIM), a configuration in which delay is applied to each of the edge pulses in the delay line based on the recording data is adopted. In this configuration, the variable delay circuit according to the present embodiment is used.

The laser driver 13 flows current into the laser diode within the pickup 1 based on the laser driving pulse being subjected to the recording compensation process, so that laser emission driving is performed. Due to this, a mark equivalent to the recording data is formed on the optical disc 90.

Further, the laser driver 13 includes so-called APC (Auto Power Control) circuit, and controls a laser output to be constant regardless of a temperature or the like, while monitoring a laser output power by the output of a detector for a monitor of the laser power provided within the pickup 1. A target value of the laser output when recording and reproducing is given from the system controller 10, so that each of laser output levels is controlled to become the target value when recording and reproducing.

The optical block servo circuit 11 generates a focus error signal from the matrix circuit 4, and generates various servo drive signals such as focus, tracking, threading, and the like from the tracking error signal, thereby performing servo operations.

That is, the optical block servo circuit 11 generates a focus drive signal and a tracking drive signal in accordance with the focus error signal and the tracking error signal, and drives a focus coil and a tracking coil of the two-axis mechanism within the pickup 1 by the two-axis driver 18. Thus, a tracking servo loop and a focus servo loop due to the pickup 1, the matrix circuit 4, the optical block servo circuit 11, the two-axis driver 18, and the two-axis mechanism are generated.

In addition, in accordance with a track jump command from the system controller 10, the optical block servo circuit 11 turns off the tracking servo loop, and outputs a jump drive signal, thereby performing a track jump operation.

In addition, the optical block servo circuit 11 generates a thread error signal obtained as a low frequency component of the tracking error signal, or a thread drive signal based on an access execution control and the like from the system controller 10, and drives the thread mechanism 3 by the thread driver 19. The thread mechanism 3 has a mechanism (not shown) including a main shaft holding the pickup 1, a thread motor, and a transfer gear, and drives the thread motor in accordance with the thread drive signal, so that a sliding movement of the pickup 1 may be achieved.

A spindle servo circuit 12 controls the spindle motor 2 to be CLV-rotated.

The spindle servo circuit 12 obtains the clock generated in the PLL process with respect to the wobble signal as current rotation velocity information of the spindle motor 2, and compares the obtained clock with predetermined CLV reference velocity information to thereby generate a spindle error signal.

In addition, so that, when reproducing data, a reproducing clock generated by the PLL within the data signal processing circuit 5 becomes the current rotation velocity information of the spindle motor 2, the spindle error signal is generated by comparing the reproducing clock with the predetermined CLV reference velocity information.

Further, the spindle servo circuit 12 outputs the spindle drive signal which is generated in accordance with the spindle error signal, and performs CLV rotation of the spindle motor by the spindle driver 17.

Moreover, the spindle servo circuit 12 generates the spindle drive signal in accordance with a spindle kick/brake control signal from the system controller 10 to thereby perform operations such as start, stop, acceleration, deacceleration, and the like of the spindle motor 2.

The above described various operations of the servo system and the recording and reproducing system are controlled by the system controller 10 formed by a micro computer.

The system controller 10 performs various processes in accordance with commands from the host device 200 given through the host interface 8.

For example, when a write command is transmitted from the host device 200, the system controller 10 moves the pickup 1 to an address to be written. Next, the above described encoding process is performed with respect to the data (for example, video data, audio data, or the like) transmitted from the host device 200, by the encoding/decoding unit 7. Next, the laser driver 13 performs the laser emission driving in accordance with the encoded data, so that recording is performed.

In addition, in a case in which a read command recorded on the optical disc 90 or a read command for requesting the transfer of data is supplied, for example, from the host device 200, the system controller 10 first performs a seek operation control on an indicated address as the target. That is, a command is transmitted to the optical block servo circuit 11, and an access operation of the pickup 1 using the address specified by the seek command as the target is performed.

Then, the system controller 10 transmits data in the indicated section to the host device 200. That is, data reading from the disc 90 is performed, and a reproduction process is performed in the data detection processing unit 5 and the encoding/decoding unit 7, thereby transmitting the necessary data.

In addition, as an example of FIG. 1, the disc drive device connected to the host device 200 has been described, however, the disc drive device may not be connected to other devices. In this case, a manipulation unit or a display unit is provided, or a configuration of an interface of data input/output is different from of that of FIG. 1. Consequently, recording or reproducing is performed in accordance with user manipulation, and a terminal for input/output of various types of data is preferably formed. Of course, various other examples as a configuration example of the disc drive device have been considered.

Figure 2:
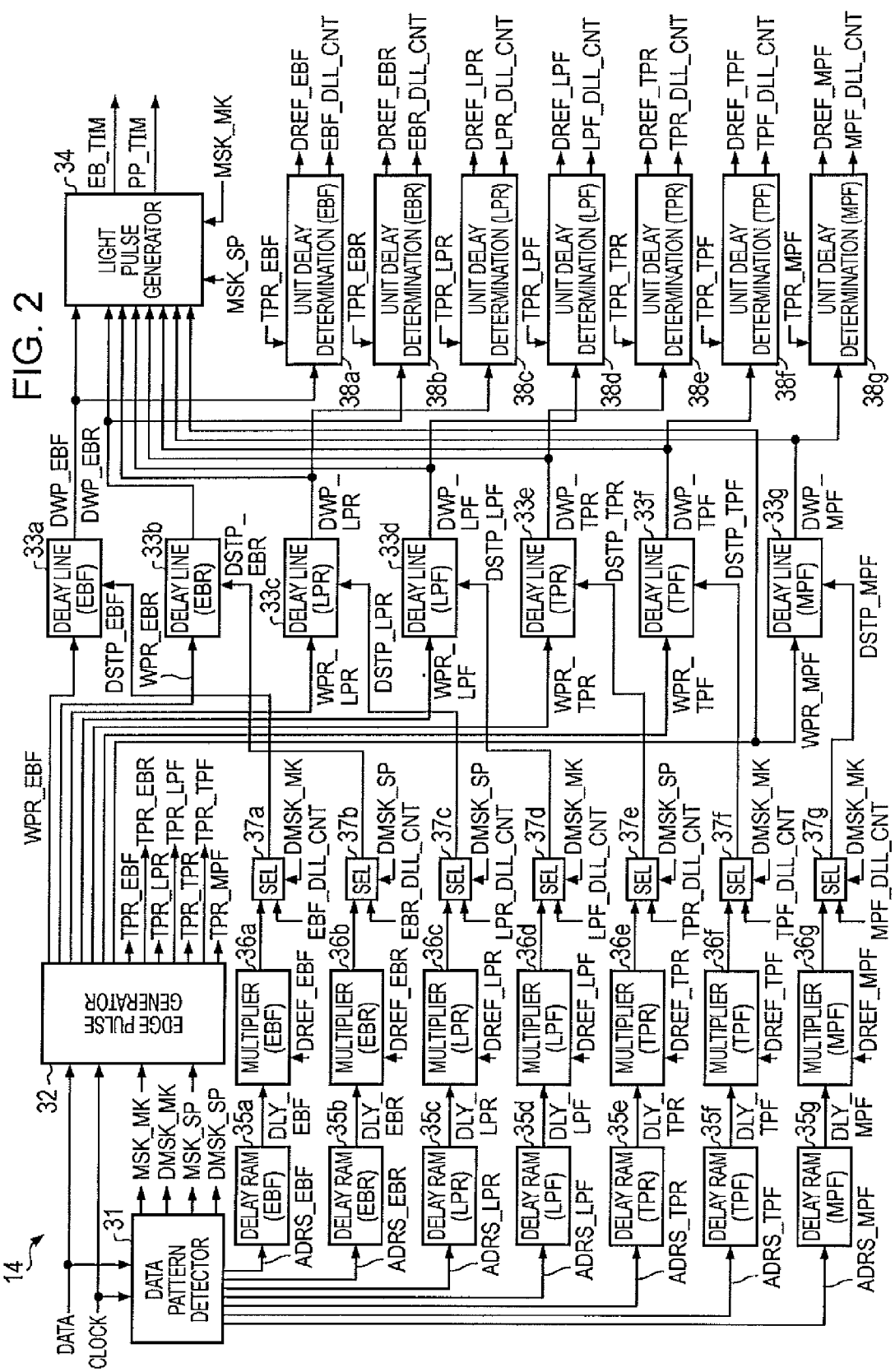
FIG. 2 is a block diagram of a write strategy unit including a variable delay circuit according to a first embodiment of the present disclosure.

In FIG. 2, a configuration of the write strategy unit 14 is illustrated. Here, a circuit configuration generating the laser driving pulse (erase bias timing EB_TIM and peak pulse timing PP_TIM) based on the recoding data (Data) in the write strategy unit 14 is shown.

Recording data (Data) and a channel clock (Clock) are input into a data pattern detector 31. The data pattern detector 31 determines a pattern of mark/space of the recording data (Data). For example, the data pattern detector 31 detects patterns of 2 T mark to 8 T mark, sync (9 T mark), 2 T space to 8 T space, and sync (9 T space).

The data pattern detector 31 outputs address values (ADRS_EBF, ADRS_EBR, ADRS_LPR, ADRS_LPF, ADRS_TPR, ADRS_TPF, ADRS_MPF) to delay RAM 35$a$ to 35$g$ in accordance with the detected patterns.

In addition, each of "EBF", "EBR", "LPR", "LPF", "TPR", "TPF", and "MPF" respectively indicates an edge timing of the laser driving pulses, as will be described in FIG. 4C. In particular, these are the edge timings being a target of timing adjustment in the write strategy unit 14. In the following description, "EBF", "EBR", "LPR", "LPF", "TPR", "TPF", and "MPF" are respectively attached to each signal (pulse), however, these indicate signals equivalent to the edge timing process.

In addition, the data pattern detector 31 outputs mask signals (MSK_MK, DMSK_MK, MSK_SP, and DMSK_SP) at the time of the pattern of a predetermined run length or more such as a sync mark period, or 8 T mark and 8 T space. The mask signals MSK_MK, DMSK_MK, MSK_SP, and DMSK_SP are output in accordance with the predetermined run length or more. These mask signals are signals for setting a calibration period of the delay amount of the delay lines 33$a$ to 33$g$.

The recording data (Data) and the channel clock (Clock) are input into the edge pulse generator 32. The edge pulse generator 32 outputs one or a plurality of edge pulses indicating one or a plurality of edge timings being a timing adjustment target when generating the laser driving pulse (EB_TIM and PP_TIM) equivalent to the recording data (Data). In this example, edge pulses (WPR_EBF, WPR_EBR, WPR_LPR, WPR_LPF, WPR_TPR, WPR_TPF, and WPR_MPF) are output by enabling the edges of "EBF", "EBR", "LPR", "LPF", "TPR", "TPF", and "MPF" to be the adjustment target.

In addition, in this case, the edge pulse generator 32 outputs a test pulse for a calibration operation of a delay amount at a timing equivalent to the input of mask signals (MSK_MK and MSK_SP). The test pulse is overlapped with the edge pulses (WPR_EBF, WPR_EBR, WPR_LPR, WPR_LPF, WPR_TPR, WPR_TPF, and WPR_MPF) to thereby be output.

In addition, the edge pulse generator 32 generates comparison pulses (TPR_EBF, TPR_EBR, TPR_LPR, TPR_LPF, TPR_TPR, TPR_TPF, and TPR_MPF) each having a predetermined unit delay amount (for example, delay amount equivalent to 1 T period) with respect to the test pulse.

The delay lines 33a to 33g are provided as the delay line for delaying the respective edge pulses (WPR_EBF, WPR_EBR, WPR_LPR, WPR_LPF, WPR_TPR, WPR_TPF, and WPR_MPF).

The edge pulses (DWP_EBF, DWP_EBR, DWP_LPR, DWP_LPF, DWP_TPR, DWP_TPF, and DWP_MPF) delayed in the delay lines 33a to 33g are provided to a light pulse generator 34.

Further, the edge pulse WPR_MPF before the delay is also provided to the light pulse generator 34.

The light pulse generator 34 generates the laser driving pulses (EB_TIM and PP_TIM) by a predetermined logical operation using the respective edge pulses (DWP_EBF, DWP_EBR, DWP_LPR, DWP_LPF, DWP_TPR, DWP_TPF, and DWP_MPF) passing through the respective delay lines 33a to 33g, and outputs the generated laser driving pulses to the laser driver 13.

In addition, the mask signals (MSK_MK and MSK_SP) are provided to the light pulse generator 34, and elimination of the test pulses overlapped with the edge pulses (DWP_EBF, DWP_EBR, DWP_LPR, DWP_LPF, DWP_TPR, DWP_TPF, DWP_MPF) at a timing equivalent to this is performed.

A delay RAM 35 (35a to 35g), a multiplier 36 (36a to 36g), and a selector 37 (37a to 37g) are provided as the delay setting unit with respect to each of the delay lines 33a to 33g.

In the delay RAM 35 (35a to 35g), the delay amount to be given with respect to each corresponding edge pulse is stored. Each of the delay RAM 35 (35a to 35g) reads delay amount data (DLY_EBF, DLY_EBR, DLY_LPR, DLY_LPF, DLY_TPR, DLY_TPF, and DLY_MPF) in accordance with an address value from the data pattern detector 31.

For example, in the delay RAM 35a, an address in which delay amount data to be given to the edge pulse WPR_EBF is stored in accordance with a data pattern of a current recording data (Data) is designated by the address value ADRS_EBF from the data pattern detector 31. Delay amount data DLY_EBF stored in the designated address is read from the delay RAM 35a. For example, in the case of being made to be delayed by a time equivalent to $(5/32)T$, the delay amount data DLY_EBF is a value of $5/32$.

Delay amount data (DLY_EBF, DLY_EBR, DLY_LPR, DLY_LPF, DLY_TPR, DLY_TPF, and DLY_MPF) from the respective delay RAM 35a to 35g is respectively supplied to the multipliers 36a to 36g.

The number of reference delay stages (DREF_EBF, DREF_EBR, DREF_LPR, DREF_LPF, DREF_TPR, DREF_TPF, and DREF_MPF) from each of the unit delay determining units 38a to 38g is supplied to the multipliers 36a to 36g as the unit delay control value. The number of reference delay stages is a value indicating the number of delay stages for realizing delay of the unit delay amount (for example, delay amount equivalent to 1 T period) in the delay lines 33a to 33g.

Each of the multipliers 36a to 36g outputs setting values (DSTP_EBF, DSTP_EBR, DSTP_LPR, DSTP_LPF, DSTP_TPR, DSTP_TPF, and DSTP_MPF) of the number of delay stages with respect to each of the delay lines 33a to 33g.

For example, the multiplier 36a multiplies the delay amount data DLY_EBF and the number of reference delay stages DREF_EBF, and outputs the multiplied result as the setting value DSTP_EBF of the number of delay stages with respect to the delay line 33a. It is assumed that the delay amount data DLY_EBF=$5/32$, that is, delay of $(5/32)T$ is given to the edge pulse WPR_EBF. In addition, in a case in which the number of reference delay stages DREF_EBF=64, that is, delay of 1 T is given in the delay line 33a, delay of 64 stages is performed. In this case, the multiplier 36a outputs, to the delay line 33a, the setting value of the number of delay stages DSTP_EBF=10 resulting from $(5/32)\times 64=10$. Thus, in the delay line 33a, delay of delay element 10 stages is set.

However, the outputs of the multipliers 36a to 36g are supplied to each of the delay lines 33a to 33g through each of the selectors 37a to 37g.

The selectors 37a to 37g typically select the outputs of the multipliers 36a to 36g, and the setting values of the number of delay stages (DSTP_EBF, DSTP_EBR, DSTP_LPR, DSTP_LPF, DSTP_TPR, DSTP_TPF, and DSTP_MPF) from the multipliers 36a to 36g are supplied to delay lines 33a to 33g.

In the selectors 37a to 37g, a switching control is performed by mask signals (DMSK_MK and DMSK_SP). In the calibration period of the delay amount, the selectors 37a to 37g select outputs of the unit delay determining units 38a to 38g by the mask signals (DMSK_MK and DMSK_SP).

The unit delay determining units 38a to 38g supply the number of reference delay stages (EBF_DLL_CNT, EBR_DLL_CNT, LPR_DLL_CNT, LPF_DLL_CNT, TPR_DLL_CNT, TPF_DLL_CNT, and MPF_DLL_CNT) to the selectors 37a to 37g, as the unit delay control value.

The number of reference delay stages (EBF_DLL_CNT to MPF_DLL_CNT) is a count value by an up/down counter (see, 41a and the like of FIG. 12) within the unit delay determining units 38a to 38g, which will be described in detail later. Meanwhile, the number of reference delay stages (DREF_EBF to DREF_MPF) supplied to the multipliers 36a to 36g is a count value in a locked state which is obtained through a lock detection unit (see, 42a and the like of FIG. 12) with respect to the count value of the up/down counter.

In the calibration period, the selectors 37a to 37g select the number of reference delay stages (EBF_DLL_CNT to MPF_DLL_CNT), and supply the selected number to the delay lines 33a to 33g. In this case, the delay lines 33a to 33g perform delay of the number of stages equivalent to 1 T as the count value of the up/down counter at that time.

The edge pulses (DWP_EBF to DWP_MPF), that is, outputs of the respective delay lines 33a to 33g are supplied to the unit delay determining units 38a to 38g. This means that the edge pulses (DWP_EBF to DWP_MPF) and overlapped test pulses are supplied in the calibration period.

In addition, comparison pulses (TPR_EBF to TPR_MPF) from the edge pulse generator 32 are supplied to the unit delay determining units 38a to 38g.

The unit delay determining units 38a to 38g are provided to correspond to each of the delay lines 33a to 33g. In the calibration period, each of the unit delay determining units 38a to 38g gives the unit delay control values (the number of reference delay stages EBF_DLL_CNT to MPF_DLL_CNT) to corresponding delay amount variable setting units 35, 36, and 37 (in this example, selectors 37a to 37g), and sets delay of the unit delay amount (1 T delay) in the corresponding delay lines 33a to 33g.

Further, the unit delay determining units 38a to 38g performs a phase comparison between the comparison pulses (TPR_EBF to TPR_MPF) and the test pulses in which the unit delay amount (1 T delay) is given through the corresponding delay lines 33a to 33g, that is, the test pulses overlapped with the edge pulses (DWP_EBF to DWP_MPF). Next, up/down count equivalent to the result of the phase comparison is performed, so that the unit delay control values (the number of reference delay stages EBF_DLL_CNT to MPF_DLL_CNT, and DREF_EBF to DREF_MPF) equivalent to the unit delay amount are obtained.

Next, as the calibration result, the number of reference delay stages DREF_EBF to DREF_MPF is supplied to the multipliers 36a to 36g as described above.

In this example, the write strategy unit 14 is configured as shown in FIG. 2. The laser driving pulses (erase bias timing EB_TIM, and peak pulse timing PP_TIM) are generated based on the recording data (Data) by the configuration shown in FIG. 2. In addition, a delay amount setting in each of the delay lines 33a to 33g is calibrated in order by operations of the unit delay determining units 38a to 38g, so that accuracy of the laser driving pulse (EB_TIM and PP_TIM) is stabilized.

Hereinafter, a generation operation of the laser driving pulses (EB_TIM and PP_TIM) will be described in detail.

2. Generation of Laser Driving Pulse

Recording compensation is performed by the write strategy unit 14 in the recording apparatus equivalent to the optical disc 90 with high accuracy, as in the disc drive device according to the present embodiment.

First, the concept of the recording compensation is illustrated in FIGS. 3A and 3B.

FIG. 3A shows a laser emission waveform at the recording of a write-once type disc, and FIG. 3B shows a laser emission waveform at the recording of a rewritable type disc (each being an example).

In each of FIGS. 3A and 3B, a channel clock (Clock) and recording data (Data) are commonly shown. In addition, a mark string recorded on the disc 90 by the shown laser emission waveform is shown.

Both types are thermal recording, and when a height (emission power) of the laser emission waveform and a width (emission timing) thereof are not appropriately controlled, a length of the mark recorded on the disc 90 is shifted from the original recording data, thereby causing deterioration in reproduction characteristics and data reliability.

Figure 4A:
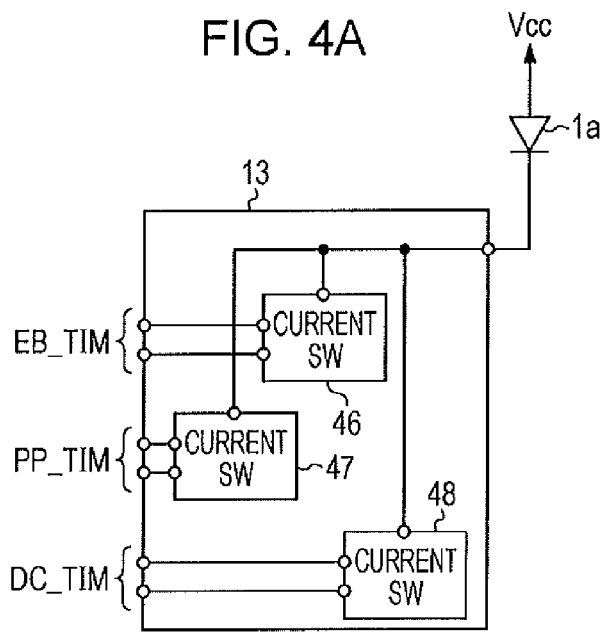
FIGS. 4A, 4B, and 4C are explanatory diagrams of a laser driver and a laser driving pulse according to an embodiment of the present disclosure.
Figure 4B:
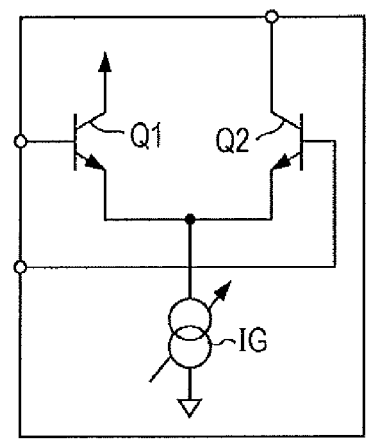
Figure 4C:
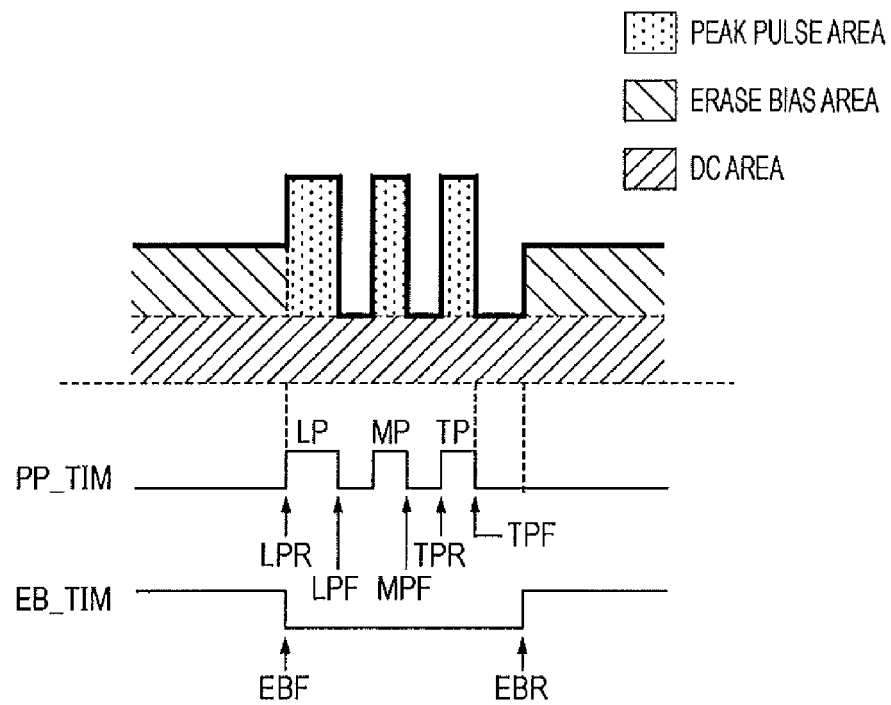

An operation for obtaining the laser emission waveform shown in FIGS. 3A and 3B is described in FIGS. 4A, 4B, and 4C.

FIG. 4A shows a laser diode driving system within the laser driver 13. In FIG. 4A, a laser diode 1a within the optical pickup 1 is shown, however, current switches 46, 47, and 48 are provided in the laser diode 1a.

The current switches 46, 47, and 48 include a differential pair of transistors Q1 and Q2 shown in FIG. 4B, and a variable current source IG.

The laser diode 1a (semiconductor laser) as a light source used in the optical recording apparatus is a current driving element.

Therefore, the current switches 46, 47, and 48 for controlling the variable current source IG in an external signal are subjected to open-collector connection or open-drain wired OR connection with the laser diode 1a, so that the laser emission waveform shown in FIG. 4C is generated.

As shown in FIG. 4C, the laser emission waveform includes a DC part, an erase bias part, and a peak pulse part. For example, a constant current 400 mA as the DC part, a current 20 mA of the erase bias part, and a current 40 mA of the peak pulse are combined to generate the laser emission waveform.

Next, a current as the erase bias is controlled in the erase bias timing EB_TIM as the laser driving pulse from the above described write strategy unit 14, and a current as the peak pulse is controlled in the peak pulse timing PP_TIM. A waveform of the erase bias timing EB_TIM and the peak pulse timing PP_TIM is shown in a lower part of FIG. 4C.

That is, the erase bias timing EB_TIM is differentially input into the current switch 46. Thus, the differential pair of the transistors Q1 and Q2 is controlled, and the current 20 mA of the erase bias part flows by the variable current source IG.

In addition, the peak pulse timing PP_TIM is differentially input into the current switch 47. Thus, the differential pair of the transistors Q1 and Q2 is controlled, and the current 40 mA of the pick pulse part flows by the variable current source IG.

In addition, a DC timing DC_TIM is differentially input into the current switch 48 by being connected when recording. Thus, the differential pair of the transistors Q1 and Q2 is controlled, and the constant current 40 mA flows by the variable current source IG.

As a result, by the combination of these, a current equivalent to the laser emission waveform flows into the laser diode 1a to thereby be laser emitted.

A level of the peak pulse and the erase bias depends on current value setting of a variable current source of each of the current switches 47 and 46.

As for the recording compensation, the peak pulse of the laser emission waveform and a timing of the erase bias as well as only pulse level are adjusted. Typically, the adjustment accuracy is realized more finely than 1 clock (1 T) of a sync circuit, and it is difficult to configure a recording compensation circuit only using the sync circuit. Here, the write strategy unit 14 generates the peak pulse timing PP_TIM and the erase bias timing EB_TIM obtained by adjusting the edge timing using the delay lines 33a to 33g.

For example, the edge timing of each of the laser driving pulses (PP_TIM and EB_TIM) shown in FIG. 4C is a target of the adjustment.

The peak pulse timing PP_TIM is configured from a mark unit leading pulse LP (Leading Pulse), a mark unit trailing pulse TP (Trailing Pulse), and an intermediate pulse MP (Multi Pulse). However, a pulse configuration of the peak pulse timing PP_TIM is changed by a mark length which records.

For example, at the time of recording of 2 T mark, the peak pulse timing PP_TIM is configured only from the mark unit leading pulse LP.

At the time of recording of 3 T mark, the peak pulse timing PP_TIM is configured from the mark unit leading pulse LP and the mark unit trailing pulse TP.

At the time of recording of a 4 T mark, the peak pulse timing PP_TIM is configured from the mark unit leading pulse LP, the intermediate pulse MP, and the mark unit trailing pulse TP.

At the time of recording of a 5 T mark or more, the number of the intermediate pulse MPs is at least two.

For example, with respect to the above described pulse configuration, the following edge parts are a target of the adjustment.

LPR: rising edge of mark unit leading pulse LP (rising)
LPF: falling edge of mark unit leading pulse LP (falling)
TPR: rising edge of mark unit trailing pulse TP
TPF: falling edge of mark unit trailing pulse TP
MPF: falling edge of intermediate pulse MP The erase bias timing EB_TIM is changed to an L level in the recording mark leading part. This is referred to as Erase Bias Fall (EBF), and a part where the erase bias timing EB_TIM is changed to an H level in the recording mark trailing part is referred to as Erase Bias Rise (EBR).

Next, in the erase bias timing EB_TIM, the following edge parts are a target of the adjustment.

EBF: falling edge of erase bias timing EB_TIM
EBR: rising edge of erase bias timing EB_TIM In the write strategy unit 14 according to the present embodiment shown in FIG. 2, the recording compensation is performed with respect to the peak pulse timing PP_TIM and the erase bias timing EB_TIM, using edges of seven parts as the target of the adjustment, and then the laser driving pulses (PP_TIM and EB_TIM) are generated.

Further, the adjustment part in the recording compensation is not limited to the seven parts. For example, in some cases, the rising edge of the intermediate pulse MP is added to the adjustment part, or the number of the adjustment parts is reduced.

Figure 5:
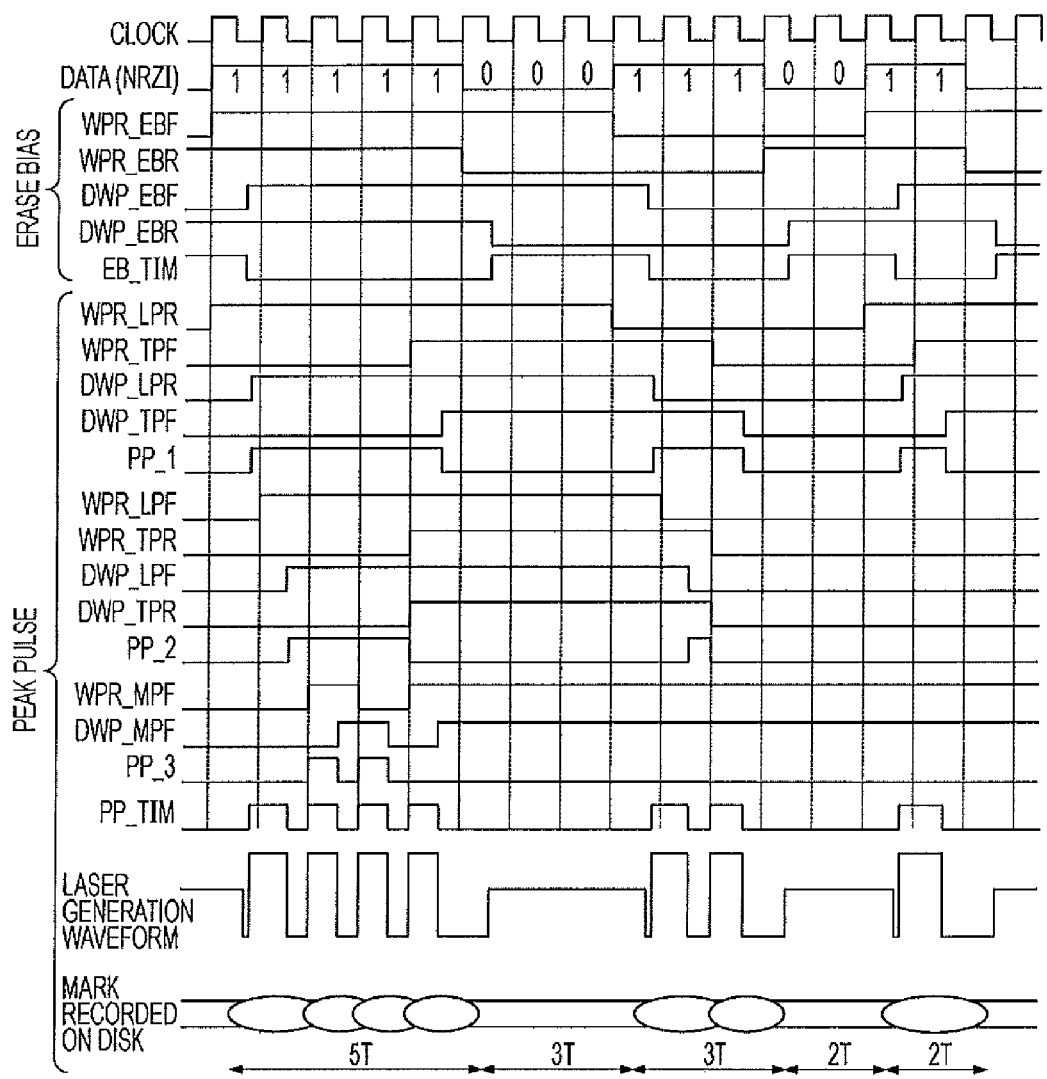
FIG. 5 is an explanatory diagram of a pulse for generation of a laser driving pulse according to an embodiment of the present disclosure.

FIG. 5 shows a process in which the laser driving pulses (PP_TIM and EB_TIM) are generated in accordance with the recording data (Data). In addition, the laser emission waveform and the recording data obtained by the laser driving pulses (PP_TIM and EB_TIM) are shown in FIG. 5.

Figure 6A:
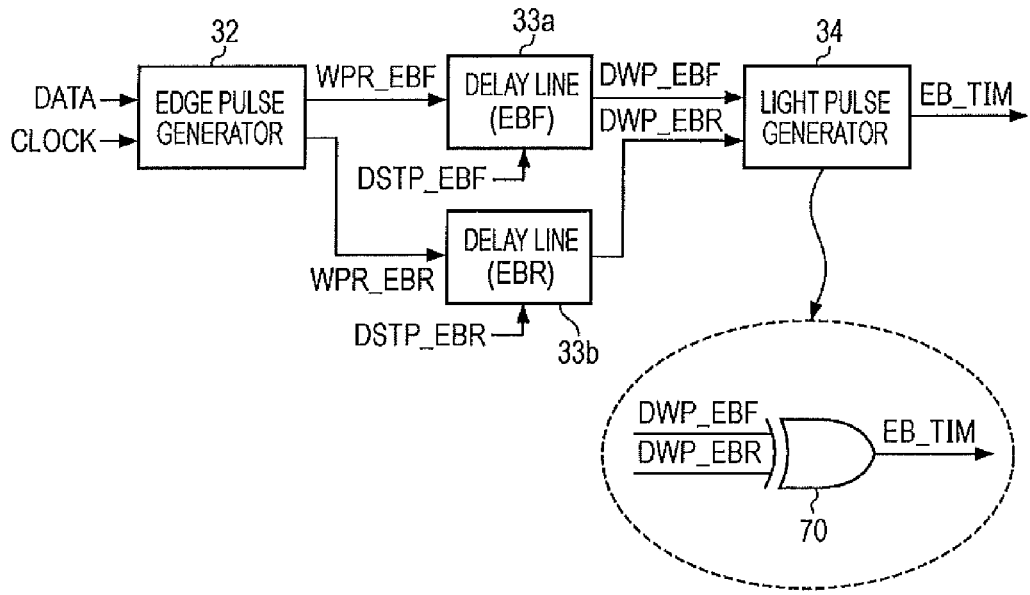
FIGS. 6A and 6B are explanatory diagrams of a laser driving pulse generating system according to an embodiment of the present disclosure.

Only a generation part of the erase bias timing EB_TIM is extracted from the above described configuration of FIG. 2 in FIG. 6A.

The edge pulse generator 32 outputs the edge pulses WPR_EBF and WPR_EBR in accordance with the recording data (Data) and the clock (Clock). The edge pulses WPR_EBF and WPR_EBR are pulses indicating timings of start and finish ends of a mark part "1" from NRZI recording data (Data), that is, timings of EBF and EBR, as shown in FIG. 5. The edge pulse generator 32 performs recording data (Data) shift registration, and performs edge detection, thereby generating the edge pulses WPR_EBF and WPR_EBR.

Delay less than 1 T is given to the edge pulses WPR_EBF and WPR_EBR in the delay lines 33a and 33b.

This is done to obtain edge pulses DWP_EBF and DWP_EBR as a prescribed EBF timing and EBR timing shown in FIG. 5 from the edge pulses WPR_EBF and WPR_EBR of clock sync. Further, a delay amount for the edge pulses WPR_EBF and WPR_EBR is set in the above described setting value of the number of delay stages DSTP_EBF and DSTP_EBR.

The delayed edge pulses DWP_EBF and DWP_EBR are input into the light pulse generator 34.

In the light pulse generator 34, an EX-OR circuit 70 is provided, as shown within broken lines, as a generation circuit of the erase bias timing EB_TIM. Consequently, in order to obtain the polarity of "L" in the mark unit and "H" in the space unit, an exclusive OR is operated in the EX-OR circuit 70 with respect to the edge pulses DWP_EBF and DWP_EBR, so that the erase bias timing EB_TIM is generated as shown in FIG. 5. That is, the erase bias timing EB_TIM in which the timings of EBF and EBR are adjusted is obtained.

Further, as shown in FIG. 5, for the purpose of the pulse generation due to the EX-OR circuit 70, a scheme in which only the relationship of the polarity is managed using the edge pulses WPR_EBF and WPR_EBR in which the polarity is inverted in the edges of EBF and EBR of one time is given as an example, however, the generation scheme of the erase bias timing EB_TIM is not limited thereto.

Next, an example of the generation scheme of the peak pulse timing PP_TIM will be described in detail.

As described above, as for the peak pulse timing PP_TIM, LPR, LPF, TPR, TPF, and MPF are edge timings of the adjustment target.

As shown in FIG. 2, the edge pulse generator 32 outputs the edge pulses WPR_LPR, WPR_LPF, WPR_TPR, WPR_TPF, and WPR_MPF indicating the timings corresponding LPR, LPF, TPR, TPF, and MPF.

Similarly to the case of the erase bias timing EB_TIM, prescribed delay is applied to these in the delay lines 33c to 33g, and these are supplied, as the edge pulses DWP_LPR, DWP_LPF, DWP_TPR, DWP_TPF, and DWP_MPF, to the light pulse generator 34 as shown in FIG. 5.

Figure 6B:
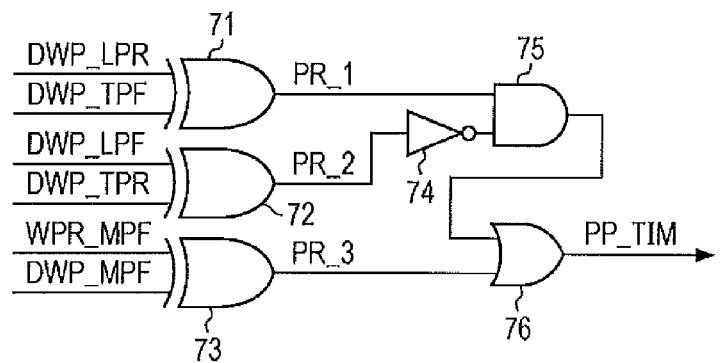

In the light pulse generator 34, a logical operation circuit as shown in FIG. 6B is provided as the generation circuit of the peak pulse timing PP_TIM.

The EX-OR circuit 71 generates a pulse PP_1 having a width ranging from LPR to TPF, as shown in FIG. 5, by operating the exclusive OR of the edge pulses DWP_LPR and DWP_TPF.

Similarly, the EX-OR circuit 72 generates a pulse PP_2 having a width ranging from LPF to TPR, as shown in FIG. 5, by operating the exclusive OR of the edge pulses DWP_LPF and DWP_TPR.

A logical AND is operated with respect to an inverted signal of the pulse PP_1 and the pulse PP_2 through an inverter 74 in an AND circuit 75, so that timings of the mark unit leading pulse LP (Leading Pulse) and the mark unit trailing pulse TP (Trailing Pulse) are generated.

Further, the exclusive OR is operated, in the EX-OR circuit 73, with respect to the edge pulse WPR_MPF before delay and the edge pulse DWP_MPF after delay, so that a pulse PP_3 of the timing of the intermediate pulse (Multi Pulse) is generated as shown in FIG. 5.

Finally, in the OR circuit 76, the logical OR of the pulse PP_3 and an output (PP_1 & PP_2) of the AND circuit 75 is operated, so that a desired PP_TIM shown in FIG. 5 can be obtained. That is, the peak pulse timing PP_TIM in which LPR, LPF, TPR, TPF, and MPF are adjusted is obtained.

Here, as for the peak pulse timing PP_TIM and the erase bias timing EB_TIM, delay less than 1 T is able to be performed in the delay lines 33a to 33g for the purpose of adjustment of each of the timings.

In FIGS. 7A, 7B, 7C, and 7D, configuration examples of the delay line (33a to 33g) are shown.

Figure 7A:
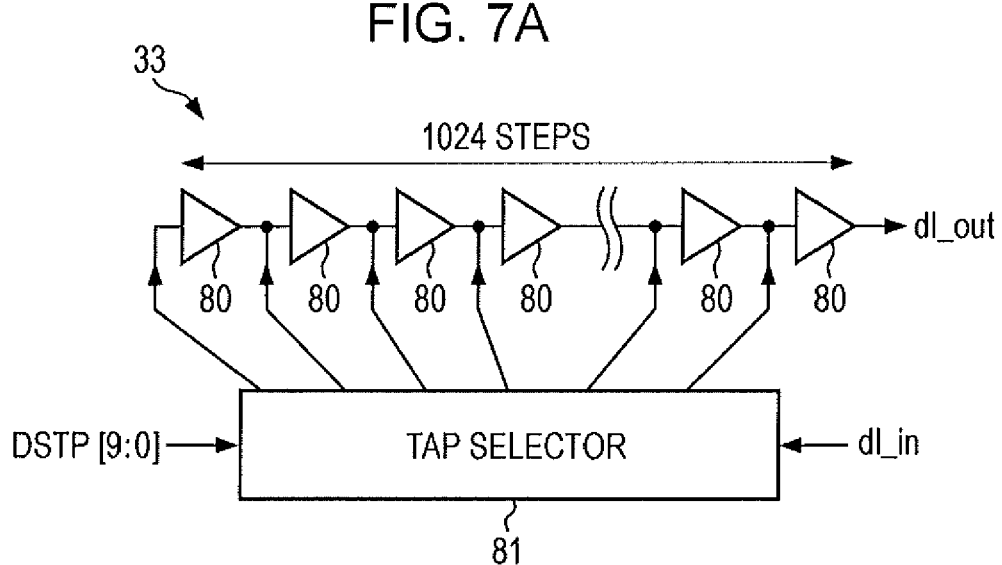
FIGS. 7A, 7B, 7C, and 7D are explanatory diagrams of a delay line according to a first embodiment of the present disclosure.
Figure 7B:
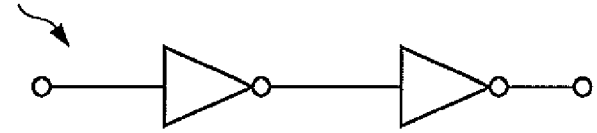
Figure 7C:
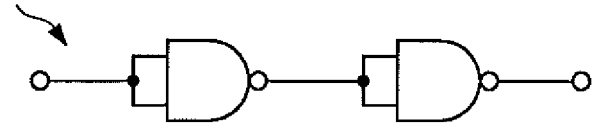

FIG. 7A illustrates an entrance selection typedelay line having a plurality of delay elements 80. In this case, 1024 elements are cascade-connected in the delay line. A single delay element 80 is realized such that 2 stages of the inverter are cascade-connected as shown in FIG. 7B, or 2 stages of an NAND circuit are cascade-connected as shown in FIG. 7C.

As for the cascade-connection of the delay element 80, a tap selector 81 selects an input stage in accordance with a setting value of the number of delay stages DSTP. A variable delay time is obtained by varying a passing stage number from an input signal dl_in to an output signal dl_out.

Figure 7D:
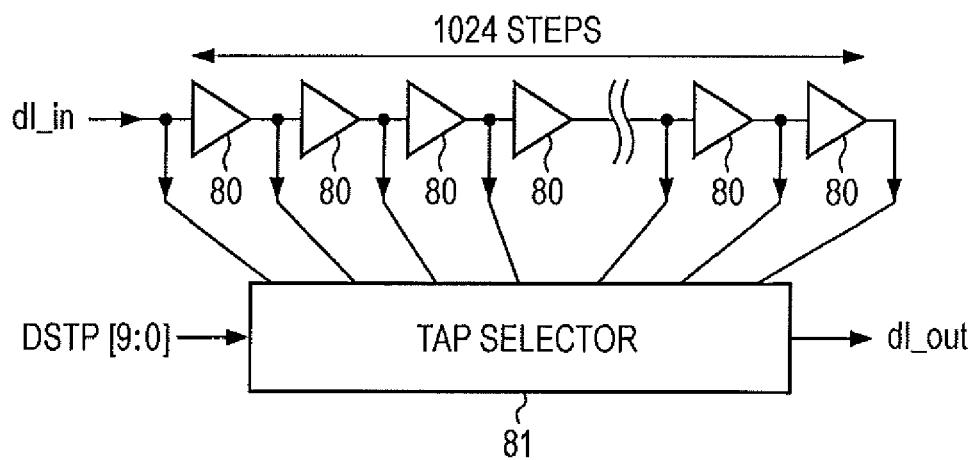

FIG. 7D illustrates an exit selection typedelay line having a plurality of delay elements 80. In this case, 1024 stages are cascade-connected in the delay line.

As for the cascade-connection of the delay element 80, a tap selector 81 selects an output terminal in accordance with the setting value of the number of delay stages DSTP. By varying the passing stage number from the input signal dl_in to the output signal dl_out, a variable delay time may be obtained.

By the delay lines 33a to 33g of the above described configuration, an arbitrary delay is applied to each of the edge pulses (WPR_EBF to WPR_MPF), so that recording compensation adjusting timings of "EBF", "EBR", "LPR", "LPF", "TPR", "TPF", and "MPF" shown in FIG. 4C are realized.

However, in a case in which the delay element 80 is configured in a CMOS logical circuit, a delay amount of a single delay element is affected by temperature, voltage, and process variations, and is not controlled from the outside.

Thus, the total delay amount is controlled by adjusting the number of the delay elements on the basis of a current delay.

3. Configuration and DLL of Comparison Example

Hereinafter, the configuration of the write strategy unit 14 proposed in the processes of the present disclosure will be described with reference to FIG. 8. This is a comparison example for facilitating the understanding of the disclosure.

Further, the same numeral references are applied to the same components as those of FIG. 2, and only components different from those of FIG. 2 will be described.

The data pattern detector 31 outputs address values ADRS_EBF to ADRS_MPF. The output of the mask signals MSK_MK, DMSK_MK, MSK_SP, and DMSK_SP of FIG. 2 is not carried out.

The edge pulse generator 32 outputs the edge pulses WPR_EBF to WPR_MPF. The output of the test pulses and the comparison pulses TPR_EBF to TPR_MPF is not carried out.

The delay lines 33a to 33g are provided with respect to the edge pulses WPR_EBF to WPR_MPF is the same.

The light pulse generator 34 generates the laser driving pulses EB_TIM and PP_TIM by a predetermined logical operation using each of the edge pulses DWP_EBF to DWP_MPF passing through each of the delay lines 33a to 33g, and outputs the generated laser driving pulses to the laser driver 13.

As the delay setting unit with respect to each of the delay lines 33a to 33g, the delay RAM 35 (35a to 35g), and the multiplier 36 (36a to 36g) are provided. The selector 37 (37a to 37g) shown in FIG. 2 is not provided.

Figure 8:
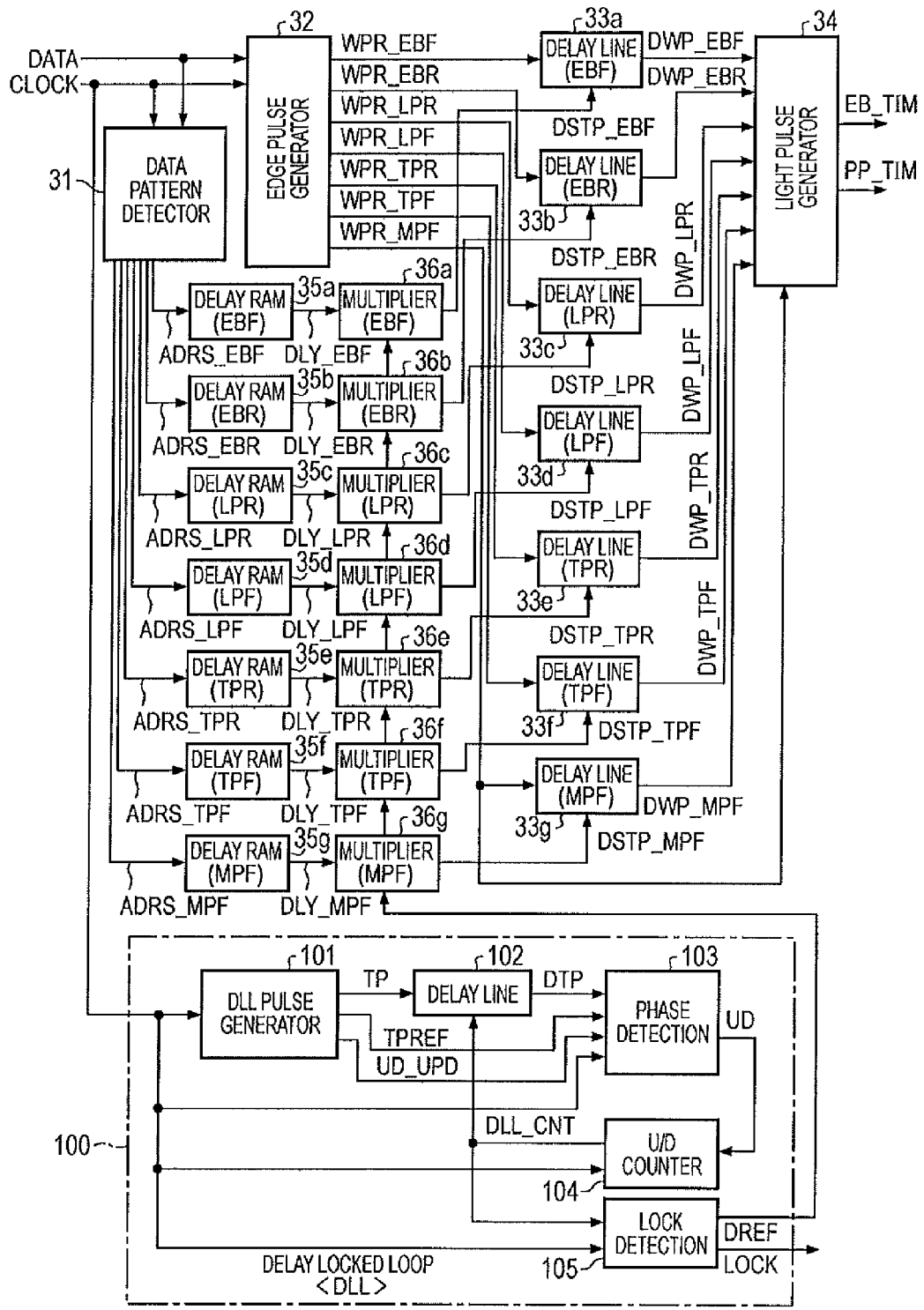
FIG. 8 is a block diagram of a write strategy unit as a comparison example.

In the comparison example of FIG. 8, a Delay Locked Loop (DLL) circuit 100 is provided, and a delay amount of each of the delay lines 33a to 33g is configured by operations of the DLL circuit 100.

Figure 10:
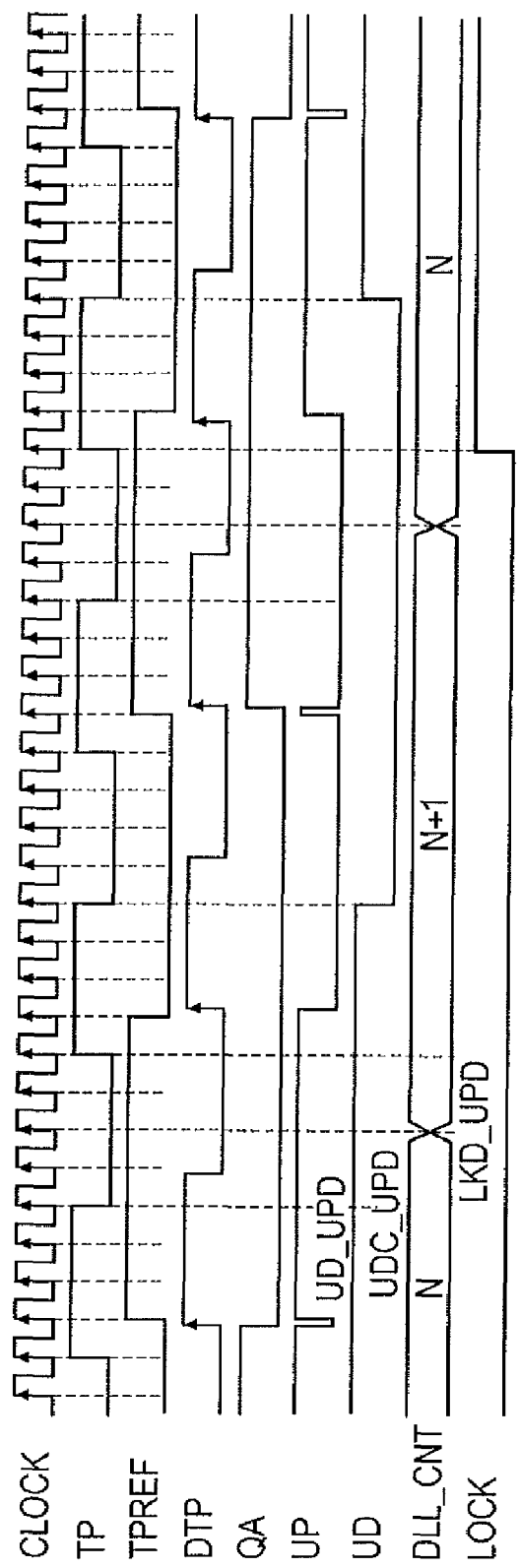
FIG. 10 is an explanatory diagram of a DLL operation.
Figure 11A:
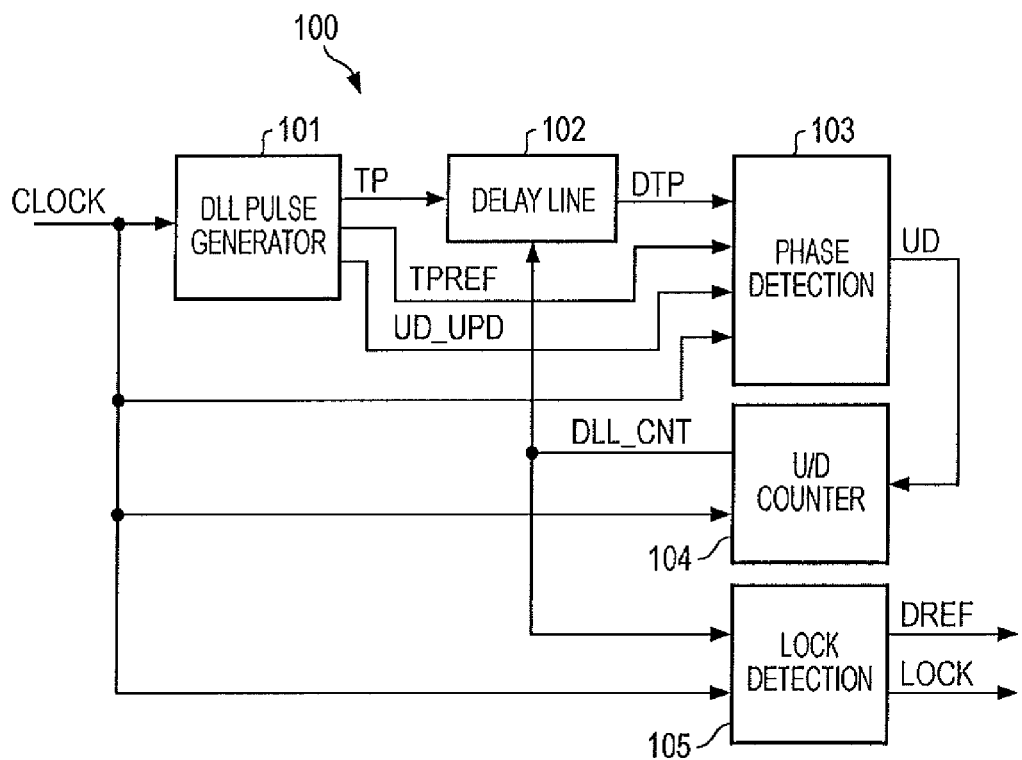
FIGS. 11A and 11B are block diagrams of a DLL and a phase detector.
Figure 11B:
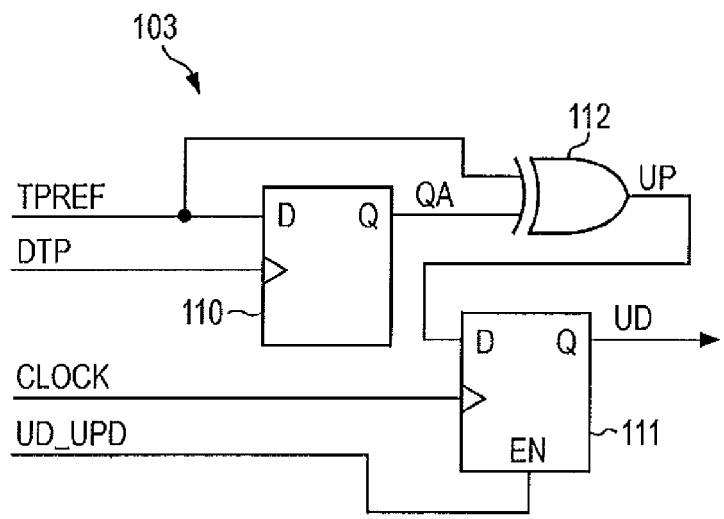

The DLL circuit 100 is shown in FIG. 11A, and a configuration of a phase detector 103 in the DLL circuit 100 is shown in FIG. 11B. In addition, an operation waveform of the DLL circuit 100 is shown in FIGS. 9 and 10.

The DLL circuit 100 includes, as shown in FIG. 11A, a DLL pulse generator 101, a delay line 102, a phase detector 103, an up/down counter 104, and a lock detection unit 105.

A clock (Clock) is input into the DLL pulse generator 101.

The DLL pulse generator 101 of clock sync generates the test pulse TP and a comparison pulse TPREF in which an edge is delayed by 1 T in a double period of the test pulse TP. The test pulse TP is input into the delay line 102.

The delay line 102 is provided as a delay line exclusive for configuration, separately from the delay lines 33a to 33g. This configuration is, for example, the same as that of each of FIGS. 7A and 7D.

The delay line 102 delays the test pulse TP by the number of stages that is designated by the number of reference delay stages DLL_CNT obtained as the count value of the up/down counter 104, and obtains a delay test pulse DTP. The number of reference delay stages DLL_CNT is a value indicating the number of stages equivalent to 1 T delay.

The comparison pulse TPREF and the delay test pulse DTP are input into the phase detector 103.

The phase detector 103 performs a first arrival determination by a circuit element, that is, RS-flip flop and D-flip flop in which a first arrival determination of the comparison pulse TPREF and the delay test pulse DTPF is performed. In FIG. 11B, an example using the D-flip flop is illustrated.

As shown in FIG. 11B, the polarity of a QA signal being a Q output is inverted by the order of arrival of the delay test pulse DTP being a clock input of the D-flip flop 110, and of the comparison pulse TPREF being a D input.

Next, an UP signal obtained by operating an exclusive OR of the QA signal and the comparison pulse TPREF in the EX-OR circuit 112 is as follows.

As shown in FIG. 9A, when the delay test pulse DTP is the first arrival, only a period from an edge of the delay test pulse DTP to an edge of the comparison pulse TPREF becomes "L", and other periods become "H".

In addition, as shown in FIG. 9B, when the comparison pulse TPREF is the first arrival, only a period from an edge of the comparison pulse TPREF to an edge of the delay test pulse DTP becomes "L", and other periods become "H".

In the phase detector 103, the D-flip flop 111 is latched by the clock (Clock) at the rising edge of the delay test pulse DTP, and a timing of an update signal UD_UPD shown in the corresponding drawing that is sufficiently separated from both edges of the comparison pulse TPREF, so that the D-flip flop 111 is finally handled in the circuit of the clock sync. This Q output is an up/down indication signal UD.

As shown in FIG. 11A, the up/down indication signal UD is provided to the up/down counter 104. The up/down counter 104 performs counting in order to control the number of delay stages of the delay line 102.

The up/down counter 104 performs counting-up and counting-down of the number of delay stages based on the up/down indication signal UD from the phase detector 103, and outputs the count value as the number of reference delay stages DLL_CNT. Thus, the number of delay stages per 1 T of the delay amount by the delay line 102 is controlled.

The lock detector 105 performs comparison between the number of current delay stages and the number of delay stages before 1 clock and 2 clocks, with respect to the number of delay stages indicated in the number of reference delay stages DLL_CNT by the up/down counter 104, and outputs the number of reference delay stages DREF in order to obtain the delay amount of 1 T by a lock signal LOCK indicating whether the number of delay stages is locked and by the delay line 102.

Further, when the number of delay stages before 1 clock and 2 clocks is respectively DLL_CNT1 and DLL_CNT2 with respect to the number of current delay stages, that is, the number of reference delay stages DLL_CNT as the current count value due to the up/down counter 104, the lock signal LOCK at the time of DLL_CNT=DLL_CNT2 becomes "H', and the lock signal LOCK at the other times becomes "L".

Next, for example, DLL_CNT1 is output as the number of reference delay stages DREF at the time of DLL_CNT=DLL_CNT2 or DLL_CNT>DLL_CNT1, and the current count value DLL_CNT is output at the other times.

In FIG. 10, a state in which DLL is locked is shown.

By the up/down indication signal UD and a counting-up/down updating signal UDC_UPD delayed by several clocks from the update signal UD_UPD, the number of reference delay stages DLL_CNT alternatively repeats the counting up and down.

The lock detection unit 105 detects the above described state of alternatively repeating, and outputs, as the number of stages DREF realizing the 1 T delay, the number of stages of either higher number or lower number when a locked state LOCK is "H".

Specifically, there is proposed a scheme in which a value obtained by latching the number of reference delay stages DLL_CNT at the rising edge of DREF=DLL_CNT (LOCK="L"), and LOCK="H" is a value of the number of reference delay stages DREF at the time of LOCK="H".

Further, in FIG. 10, a unit of the counting up/down is 1, however, an arbitrary integer more than 1 may be used.

Referring again to FIG. 8, the configuration of the comparison example will be described.

The DLL circuit 100 outputs the number of reference delay stages DREF as described above. This is a value of the number of delay stages for the purpose of obtaining the 1 T delay in the delay line 102 for calibration.

The number of reference delay stages DREF is provided to the multipliers 36a to 36g. Next, each of the multipliers 36a to 36g multiplies the number of reference delay stages DREF and delay amount data (DLY_EBF to DLY_MPF) from each of the delay RAMs 35a to 35g, and outputs setting values of the number of delay stages DSTP_EBF, DSTP_EBR, DSTP_LPR, DSTP_LPF, DSTP_TPR, DSTP_TPF, and DSTP_MPF with respect to each of the delay lines 33a to 33g.

That is, in the configuration of the comparison example, the number of delay stages necessary for the unit delay amount (for example, delay amount equivalent to 1 T period) is obtained using the delay line 102 for calibration by the DLL circuit 100. That is, the number of delay stages as the unit delay amount is sequentially calibrated.

Next, using the number of reference delay stages DREF as the unit delay amount, the number of delay stages with respect to the delay lines 33a to 33g delaying the edge pulses (WPR_EBF and WPR_MPF) is controlled.

In the case of the comparison example, one problem is that the number of delay stages of the other delay lines 33a to 33g is calculated using the number of reference delay stages DREF obtained in a single delay line 102 for calibration. When each of the delay lines 33a to 33g and 102 is disposed close to each other on a CMOS integrated circuit, the unit delay amount of each of the delay lines 33a to 33g and 102 become approximately equal, however, there is still a very little variation.

The unit delay amount of each of the delay lines 33a to 33g is varied with respect to the unit delay amount of the delay line 102, so that timings of EBF, EBR, LPR, LPF, TPR, TPF, and MPF are slightly deviated from a desired timing, and recording characteristics are deteriorated.

In addition, the delay line has a large scale in terms of a circuit scale. To provide an extra delay line 102 even though the number of the delay lines is one, the calibration becomes a factor increasing a circuit configuration scale.

4. First Embodiment

In the embodiment of the present disclosure shown in FIG. 2, reduction in the adjustment accuracy due to variation in the delay amount between the delay lines is prevented, and the laser driving pulses (PP_TIM and EB_TIM) with high accuracy are obtained. Further, the increase in the circuit scale is suppressed without providing the delay line 102 for calibration.

Next, for this, each of the delay lines 33a to 33g is individually calibrated using a section of a long run length certainly existing on the recording data (Data), so that variation components remaining within the integrated circuit are compensated, and a stable pulse timing is generated.

Figure 12:
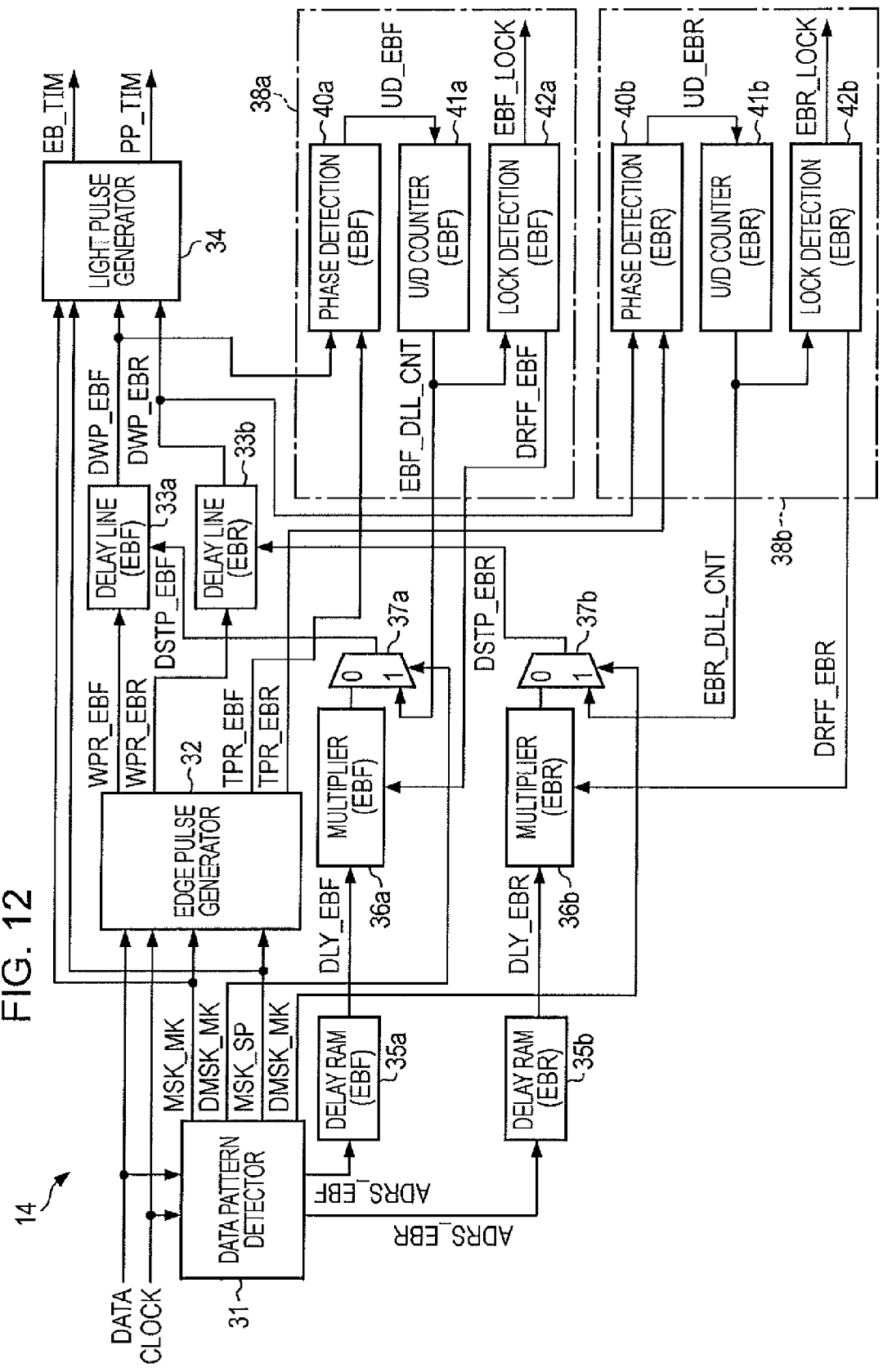
FIG. 12 is a block diagram of main parts of a write strategy unit according to a first embodiment of the present disclosure.

FIG. 12 is a diagram obtained by extracting a part of the configuration described in FIG. 2 as the first embodiment. In particular, in order to avoid the shown complexity, only a circuit system for EBF and EBR is shown, and an internal configuration of each of the corresponding unit delay determining units 38a and 38b is shown. Hereinafter, operations of EBF and EBR in the circuit system will be described, however, the same operations may be performed even in a circuit system for LPR, TPR, TPF, and MPF shown in FIG. 2.

In order to establish data frame syncing when reproducing, the optical recording apparatus generally records signals (frame sync) of the long run length at regular intervals. For example, the frame sync of 4 T→14 T is recorded on the DVD, and the frame sync of 2 T→2 T→9 T→9 T is recorded on a Blu-ray disc.

As for the delay lines 33a to 33g shown in FIGS. 2 and 11 for timing generation, a timing edge passes through the delay lines 33a to 33g only at the rising edges of data in, for example, EBF, LPR, and LPF, and the timing edge passes through the delay lines 33a to 33g only at the falling edge of data in TPR, TPF, and EBR.

Accordingly, as for the long run length encoding, the timing edge does not exist in long time delay lines 33a to 33g.

Thus, for example, at the time of recording of the Blu-ray disc, when measuring the delay amount by detecting 9 T mark and 9 T space signals, and passing the timing pulse (test pulse) for self-calibration through the each of the delay lines 33a to 33g only for the period, individual calibration of the number of delay stages of each of the delay lines 33a to 33g is possible.

Thus, according to the present embodiment, in order to define a calibration period during which a calibration operation is performed, mark/space parts of a run length with a predetermined length or more are detected. As an example, an example in which 9 T mark and 9 T space being the frame sync are detected is described.

Figure 13A:
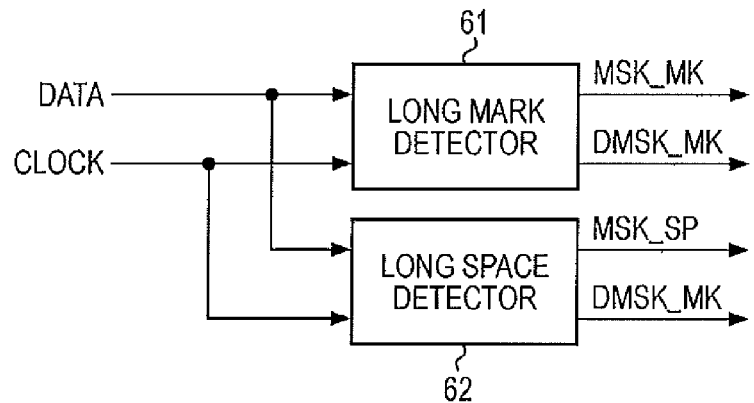
FIGS. 13A, 13B, and 13C are block diagrams of each part of a write strategy unit according to an embodiment of the present disclosure.

Within the data pattern detector 31, the long run length detection circuit shown in FIG. 13 is provided. That is, within the data pattern detector 31, a long mark detector in which the recording data (Data) and the clock (Clock) are input, and a long space detector 62 in which the same recording data (Data) and clock (Clock) are input are provided.

The long mark detector 61 outputs a mask signal MSK_MK replacing a pulse in correspondence with the 9 T space, and a mask signal DMSK_MK replacing the number of delay stages.

The long space detector 62 outputs a mask signal MSK_SP replacing a pulse in accordance with the 9 T space, and a mask signal DMSK_SP replacing the number of delay stages.

As shown in FIG. 12, the selectors 37a and 37b are subjected to switching control in the mask signal DMSK_MK and DMSK_SP. The selectors 37a and 37b generally select outputs of the multipliers 36a and 36b, and output the selected outputs to the delay lines 33a to 33g. However, a period during which the mask signals DMSK_MK and DMSK_SP are given selects the number of reference delay stages EBF_DLL_CNT and EBR_DLL_CNT to thereby output the selected number to the delay lines 33a to 33g.

Hereinafter, the unit delay determining unit 38 (38a to 38g) will be described.

The unit delay determining unit 38 (38a to 38g) includes a phase detector 40 (40a, 40b, ... ), an up/down counter 41 (41a, 41b, ... ), and a lock detector 42 (42a, 42b, ... ) as shown.

The configuration of the phase detector 40 is the same as that of FIG. 11A. However, in the case of this example, the comparison pulses (TPR_EBF to TPR_MPF), and the test pulses in which the unit delay amount (1 T delay) is given via the corresponding delay lines 33a to 33g, that is, the test pulses overlapped with the edge pulses DWP_EBF to DWP_MPF are supplied to the phase detector 40. Next, as the phase comparison operation, first arrival determination of the comparison pulses TPR_EBF to TPR_MPF and the test pulses is performed, for example, in the D-flip flop 110.

For example, D input with respect to the flip flop 110 of FIG. 11B becomes the comparison pulses TPR_EBF to TPR_MPF, and clock input of the flip flop 110 becomes the test pulse.

Next, based on the first arrival determination result, the up/down indication signal UD (UD_EBF, UD_EBR, . . . ) is output through the EX-OR circuit 112 and the D-flip flop 111.

The up/down counter 41 performs counting up and down a count value equivalent to the number of reference delay stages, based on the up/down indication signal UD (UD_EBF, UD_EBR, . . . ) from the phase detector 40, thereby outputting the count value as the number of reference delay stages.

For example, in the case of the unit delay determining unit 38a, the up/down counter 41a outputs the number of reference delay stages EBF_DLL_CNT.

In addition, in the case of the unit delay determining unit 38b, the up/down counter 41 outputs the number of reference delay stages EBR_DLL_CNT.

The lock detection unit 42 (42a, 42b, . . . ) performs comparison between the number of current delay stages and the number of delay stages before 1 clock and 2 clocks with respect to the number of delay states indicated in the number of reference delay stages (EBF_DLL_CNT, EBR_DLL_CNT, . . . ) by the up/down counter 41, and outputs the number of reference delay stages (DREF_EBF, DREF_EBR, . . . ) for obtaining the delay amount of 1 T by a lock signal LOCK indicating whether the number of delay stages is locked and by the corresponding delay lines 33a and 33g.

A relationship between the number of reference delay stages (EBF_DLL_CNT, EBR_DLL_CNT, . . . ) by the up/down counter and the number of reference delay stages (DREF_EBF, DREF_EBR, . . . ) from the lock detection unit 42 is the same as that described in FIG. 11A.

For a period during which the mask signals DMSK_MK and DMSK_SP are given to the selectors 37a and 37b, the number of reference delay stages EBF_DLL_CNT and EBR_DLL_CNT being the count value of the up/down counter 41a and 41b is supplied to the delay lines 33a and 33b.

Accordingly, for the calibration period corresponding to detection of the 9 T mark, a delay amount equivalent to 1 T at that point in time is set as the number of reference delay stages EBF_DLL_CNT by the count value of the up/down counter 41a in the delay line 33a.

In addition, for the calibration period equivalent to detection of the 9 T space, a delay amount equivalent to 1 T at that point in time is set as the number of reference delay stages EBR_DLL_CNT by the count value of the up/down counter 41b in the delay line 33b.

For the calibration period equivalent to detection of the 9 T mark, the edge pulse generator 32 overlaps a test pulse with the edge pulse WPR_EBF in accordance with the mask signal MSK_MK.

Figure 13B:
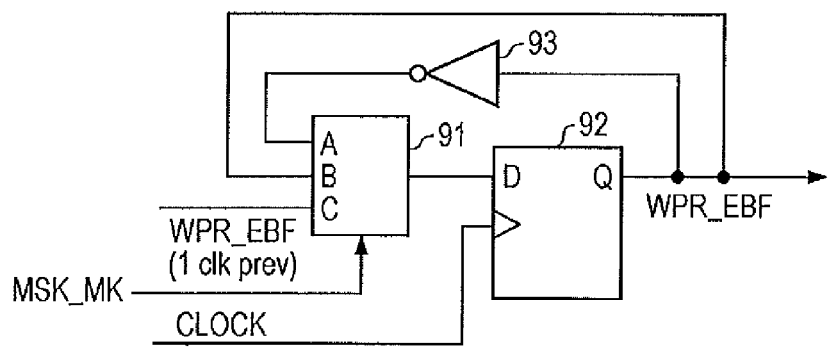

Thus, a test pulse insertion circuit as shown in FIG. 13B is provided in the edge pulse generator 32. The test pulse insertion circuit includes a selector 91, a D-flip flop 92, and an inverter 93.

The selector 91 is subjected to switching control based on the mask signal MSK_MK.

In an input A of the selector 91, a Q output of the D-flip flop 92 is inverted in the inverter 93 to thereby be input.

In an input B of the selector 91, the Q output of the D-flip flop 92 is input.

In an input C of the selector 91, the edge pulse WPR_EBF before 1 clock is input.

An input A is selected in accordance with rising edge of the mask signal MSK_MK (for example, after 2 clocks of rising edge of the mask signal MSK_MK as an example).

In addition, an input B is selected after 1 clock of the input A.

Further, after the predetermined clock, an input C is selected. Otherwise, the input C is typically selected.

Figure 14:
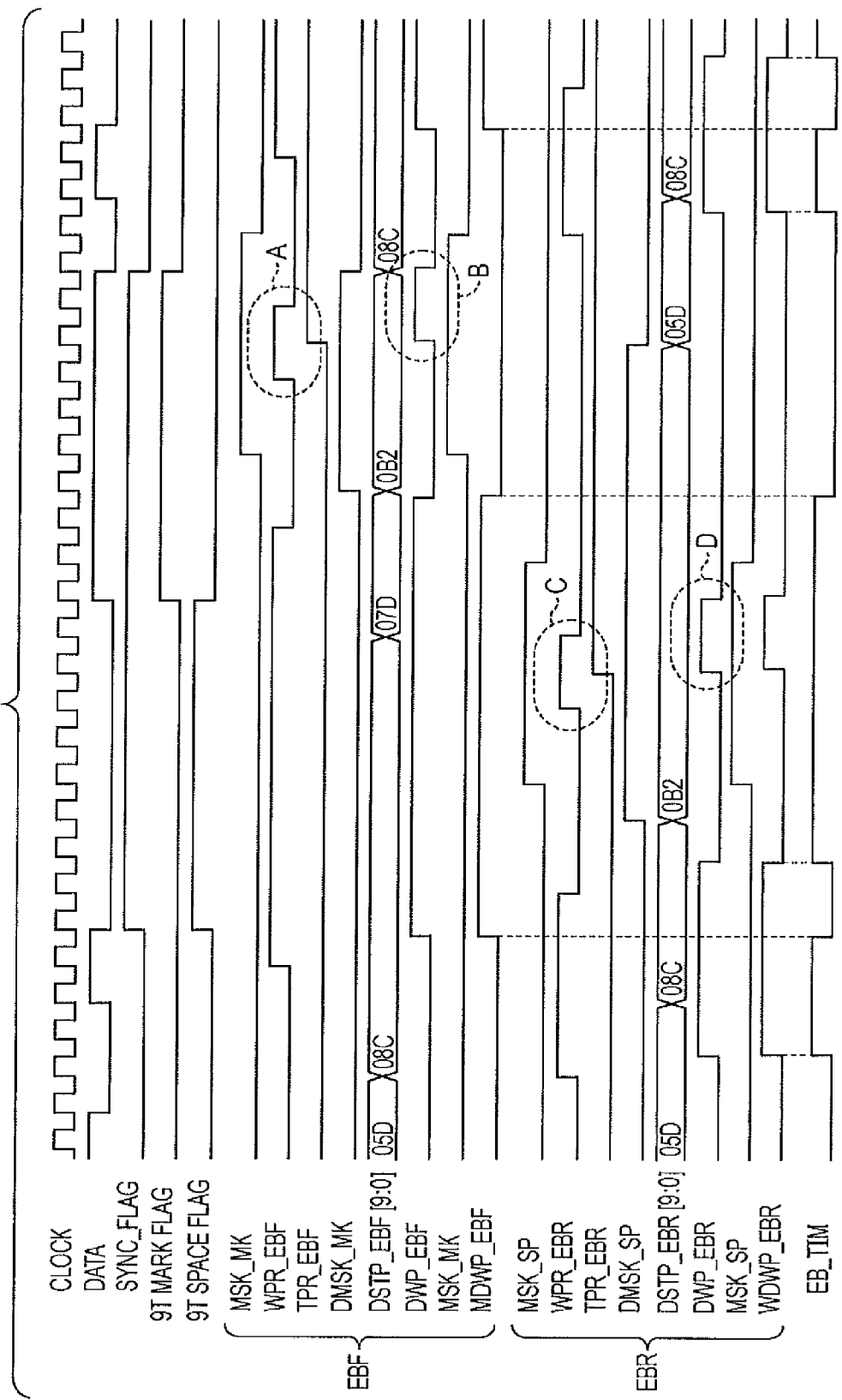
FIG. 14 is an explanatory diagram of a waveform in a case where a mask signal is operated according to an embodiment of the preset disclosure.

In the broken line part A of FIG. 14, an example of the test pulse overlapped with the edge pulse WPR_EBF is shown. For example, the input A is selected after 2 clocks where the mask signal MSK_MK shown in FIG. 14 is "H", so that an inverted signal of the edge pulse WPR_EBF before 1 clock is selected, and the selected signal becomes the test pulse. This situation is switched to the input C, after the input B is selected from the next clock timing, and regular period of time is maintained, so that it is inverted back to its original value, and the test pulse is terminated.

At the time other than the test pulse insertion time, the input C is typically valid in this selector, and a period of the mask signal MSK_MK=L does not influence the edge pulse WPR_EBF.

Here, the test pulse insertion circuit for the edge pulse WPR_EBF is shown, however, the same test pulse insertion circuit for the edge pulse WPR_EBR is provided. In the test pulse insertion circuit equivalent to the edge pulse WPR_EBR, the selector 91 is subjected to switching control by the mask signal MSK_SP.

The test pulse insertion circuit even for the other edge pulses (WPR_LPR to WPR_MPF) that is operated to correspond to the same mask signal MSK_MK or MSK_SP is provided.

In the edge pulse generator 32, the test pulse is inserted to the edge pulse WPR_EBF in the calibration period, and a comparison pulse TPR_EBF (see, FIG. 14) having 1 T delay with respect to the test pulse is output.

The test pulse is delayed by 1 T in the delay line 33a, and is supplied to the phase detector 40a of the unit delay determining unit 38a. Also, the comparison pulse TPR_EBF is supplied to the phase detector 40a. Next, these are subjected to first arrival determination (phase comparison), so that a count control of the up/down counter 41a is performed.

The number of reference delay stages EBF_DLL_CNT being the count value of the up/down counter 41a is subjected to lock determination in the lock detection unit 42, and the number of reference delay stages DREF_EBF is output. This is supplied to the multiplier 36a.

Accordingly, at the time other than the calibration period, the number of reference delay stages DREF_EBF configured based on the count value of the up/down counter 41a, and delay amount data DLY_EBF from the delay RAM 35a are multiplied, and the setting value of the number of delay stages DSTP_EBF with respect to the delay line 33a is obtained. Consequently, the delay amount of the delay line 33a is sequentially calibrated.

The configuration operations are performed even with respect to the other delay lines 33b to 33g in the same manner.

Further, the calibration operation is performed in accordance with detection of frame sync. Consequently, at the timing of the frame sync, the count value of the up/down counter 41a is controlled by one step. Thus, calibration of the number of delay stages is gradually performed over a period of time. However, since variation of the unit delay amount of the delay lines 33a to 33g gradually occurs by a temperature condition, and the like, there is no problem.

However, the test pulse is inserted to the edge pulses WPR_EBF to WPR_MPF in the calibration period, as described above. Here, it is necessary that this edge pulses WPR_EBF to WPR_MPF do not influence generation of the erase bias timing EB_TIM and the peak pulse timing PP_TIM. Thus, in the light pulse generator 34, a test pulse removal circuit shown in FIG. 13C is provided.

The test pulse removal circuit includes the D-flip flop 51 and the selector 52.

Figure 13C:
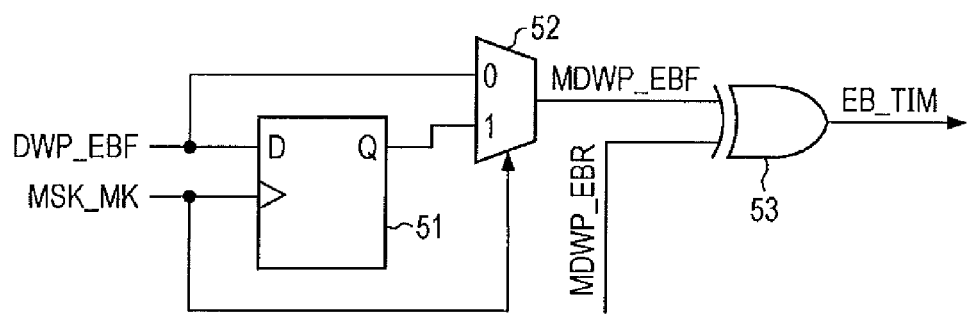

Further, referring again to FIG. 6, the exclusive OR of the edge pulses DWP_EBF and DWP_EBR is operated in the EX-OR circuit 70 by the light pulse generator 34 to thereby generate the erase bias timing EB_TIM, however, an EX-OR circuit 53 of FIG. 13C is equivalent to the EX-OR circuit 70.

The edge pulses MDWP_EBF and MDWP_EBR that is input into the EX-OR circuit 53 of FIG. 13C correspond to the edge pulses DWP_EBF and DWP_EBR in a state in which the test pulse is removed.

In the test pulse removal circuit, a level of the edge pulse DWP_EBF at an instant of the rising edge is held by a Q output of the D-flip flop 52 in the rising edge of the mask signal MSK_MK. Accordingly, the mask signal MSK_MK is connected to 1 input of the selector 52 through a delay buffer larger than a delay amount of clock input→Q output of the D-flip flop 52, so that the output of the selector 52 (MDWP_EBF) maintains a level immediately before the rising edge of the mask signal MSK_MK, in a period of the mask signal MSK_MK=H. Next, when returning to the mask signal MSK_MK=L, it follows the input edge pulse DWP_EBF.

As above, even though the level of each of the edge pulse WPR_EBF and the edge pulse DWP_EBF after the delay is changed in the period of the mask signal MSK_MK=H, it does not influence the edge pulse MDWP_EBF after removing the test pulse.

Even though omitted in FIG. 13C, a circuit for removing the test pulse using the mask signal MSK_SP from the edge pulse DWP_EBR is the same.

Accordingly, the exclusive OR of the edge pulses MDWP_EBF and MDWP_EBR after removing the test pulse is operated in the EX-OR circuit 53, thereby obtaining a desired erase bias timing EB_TIM.

Description of the peak pulse timing PP_TIM side will be omitted, however, the input edge pulses DWP_LPR, DWP_LPF, DWP_TPR, DWP_TPF, and DWP_MPF as shown in FIG. 6B may be the edge pulses obtained by removing the test pulse in each of the same circuits.

Further, at the clock input of the D-flip flop of FIG. 13B, a clock of the sync circuit may be used. In this case, the mask signal MSK_MK or a timing when the mask signal MSK_MK is advanced by 1 clock may be used in the enable signal.

As above, the circuit operations of the present embodiment have been described.

Figure 15:
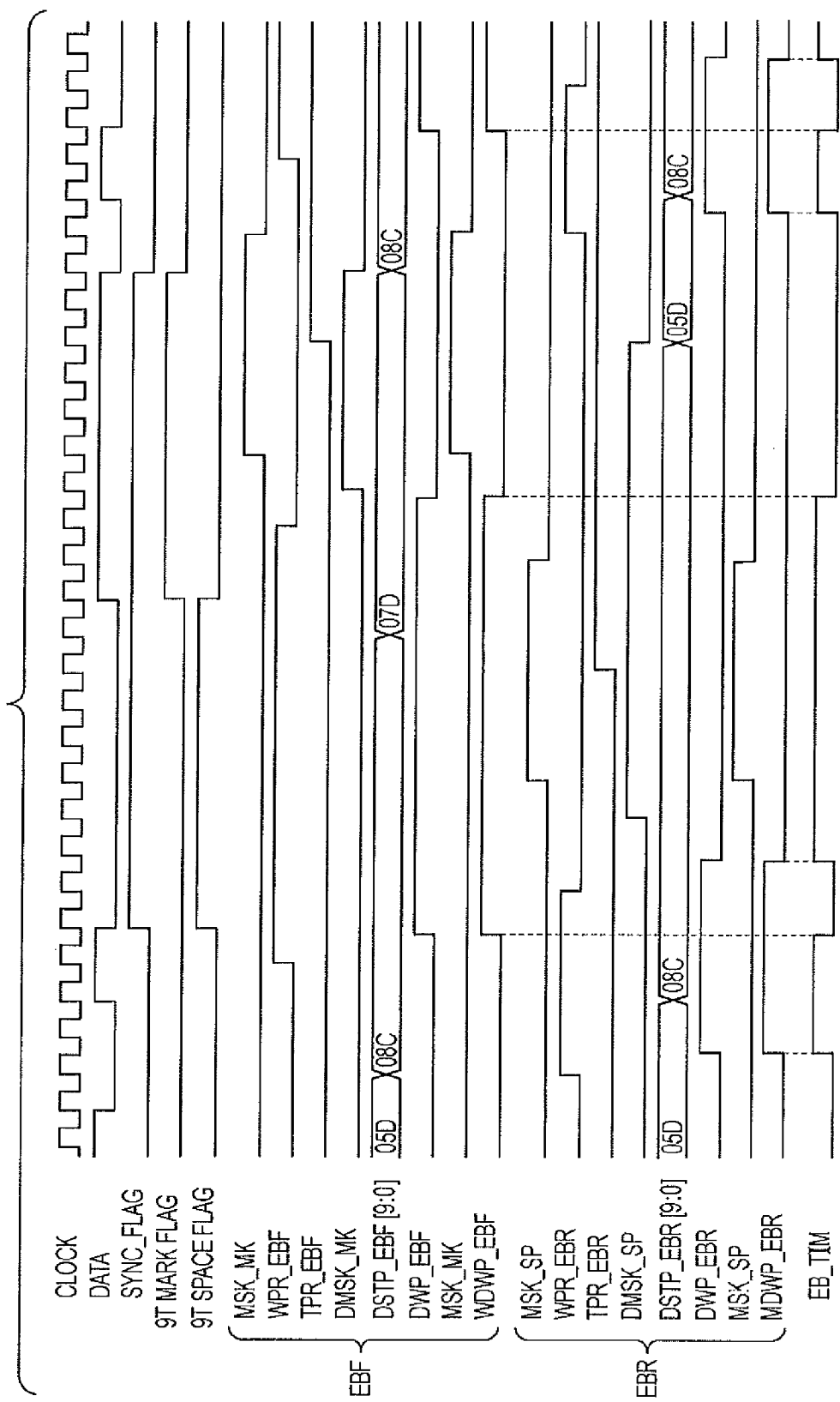
FIG. 15 is an explanatory diagram of a waveform in a case where a mask signal is stopped.

Based on results obtained by synthesizing these, a timing chart of pulse timing generation with respect to the erase bias timing EB_TIM is shown in FIG. 14. First, for the comparison, all of the above mentioned functions of the calibration period are suspended, and the same operations as the related art are shown in FIG. 15. All of mask signals become "L", and in the operations as shown in FIG. 5, the erase bias timing EB_TIM is generated.

In FIG. 14, a timing chart obtained by validating the functions of the calibration period is shown. In the period of the mask signal MSK_MK=H, the test pulse is inserted into the edge pulse WPR_EBF (see, broken line part A). In addition, to perform the same operations as those of the DLL shown in FIGS. 9 and 10, it is known that the comparison pulse TPR_EBF delayed by 1 T is toggled, so that the setting value of the number of delay stages DSTP_EBF is replaced by "B2*h*" being the number of current reference delay stages DREF_EBF in the period of the mask signal DMSK_MK=H.

The comparison pulse TPR_EBF having the edge delayed by 1 T from the test pulse, and the test pulse (see, broken line part B in the edge pulse DWP_EBF) delayed in the delay line 33*a* are subjected to first arrival determination in the phase detector 40*a*.

EBR is the same.

In the period of the mask signal MSK_SP=H, the test pulse is inserted into the edge pulse WPR_EBR (see, broken part line C). In addition, the 1 T-delayed comparison pulse TPR_EBR is toggled, so that the setting value of the number of delay stages DSTP_EBR is replaced by "B2*h*" being the number of current reference delay stages DREF_EBR, in the period of the mask signal DMSK_MK=H.

Next, the comparison pulse TPR_EBR having the edge that is delayed by 1 T from the test pulse, and the test pulse (broken line part D in the edge pulse DWP_EBR) that is delayed in the delay line 33*b* are subjected to the first arrival determination in the phase detector 40*b*.

In addition, it is known that, in the light pulse generator 34, the erase bias timing EB_TIM of the same timing as that of FIG. 15 is generated using the edge pulses MDWP_EBF and MDWP_EBR from which the test pulse is removed.

Accordingly, when being able to detect the long run length signal, and to accurately insert and remove the test pulse, it is possible to intermittently perform operations for the delay amount calibration without influencing operations of the recording compensation circuit.

Figure 16:
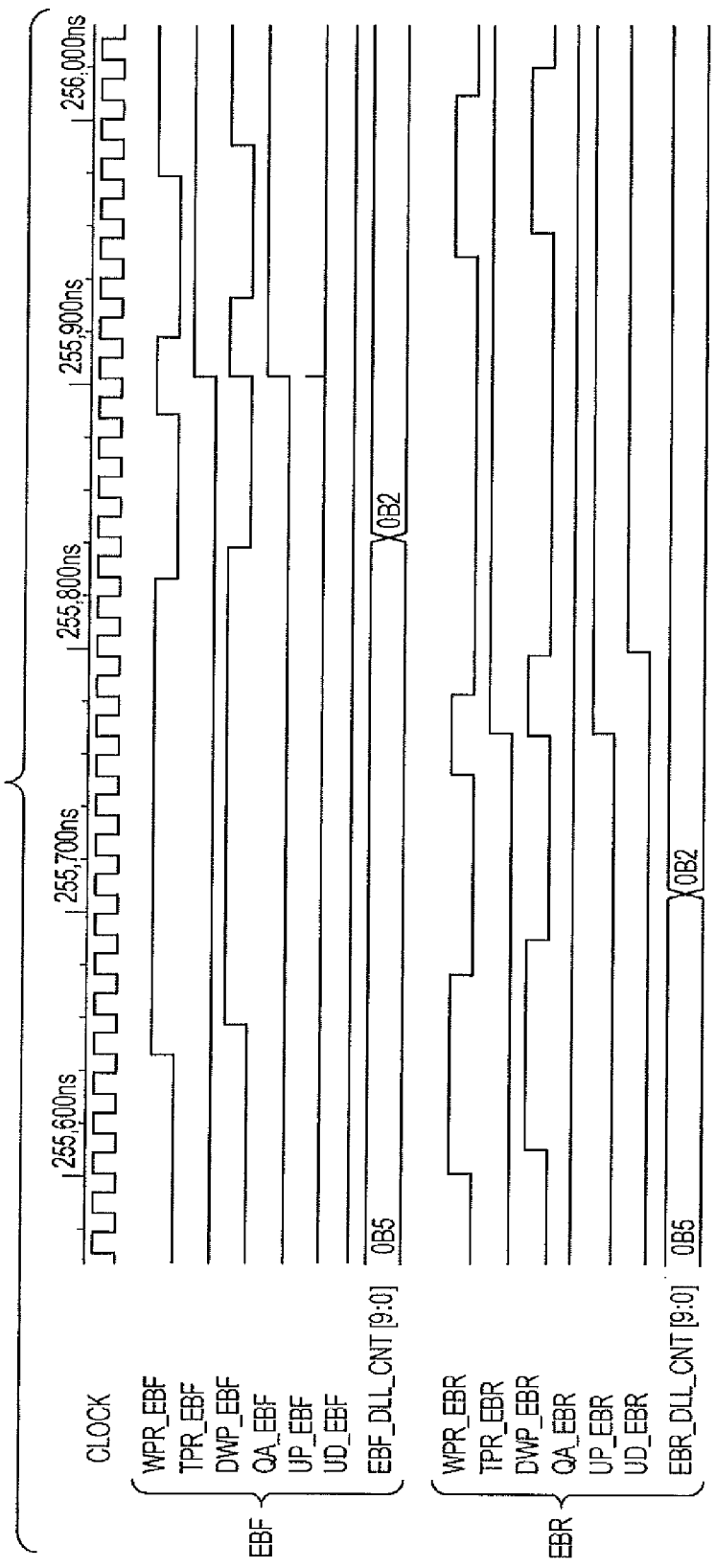
FIG. 16 is an explanatory diagram of an operation waveform of a unit delay determining unit according to an embodiment of the present disclosure.

In FIG. 16, the same delay amount calibration as that of the DLL circuit 100 shown in FIG. 11A is able to be performed inside the unit delay determining units 38*a* and 38*b* will be described.

A time difference between a rising edge in the vicinity of 255,900 ns of the edge pulse WPR_EBF and an edge of the comparison pulse TPR_EBF is 1 T, and this is the same as the case of the DLL circuit 100 described in FIGS. 9 and 10. Accordingly, the phase detector 40*a* performs the same operations as those described in FIG. 11, and delay of the edge pulse DWP_EBF is slightly greater than 1 T in FIG. 16, so that the UP signal (UP_EBF) is almost "L", and the up/down indication signal UD_EBF=L is satisfied.

The up/down indication signal UD_EBF counts down the number of reference delay stages EBR_DLL_CNT=B2*h* at the next updating timing.

The counting-down of B5*h*→B2*h* in FIG. 16 is caused by a determination result at the last frame sync timing corresponds to the up/down indication signal UD_EBF which is "L".

The updating timing of the number of reference delay stages EBR_DLL_CNT may correspond to anywhere in the frame sync interval, however, updating immediately before the next frame sync is given as this example.

Figure 17:
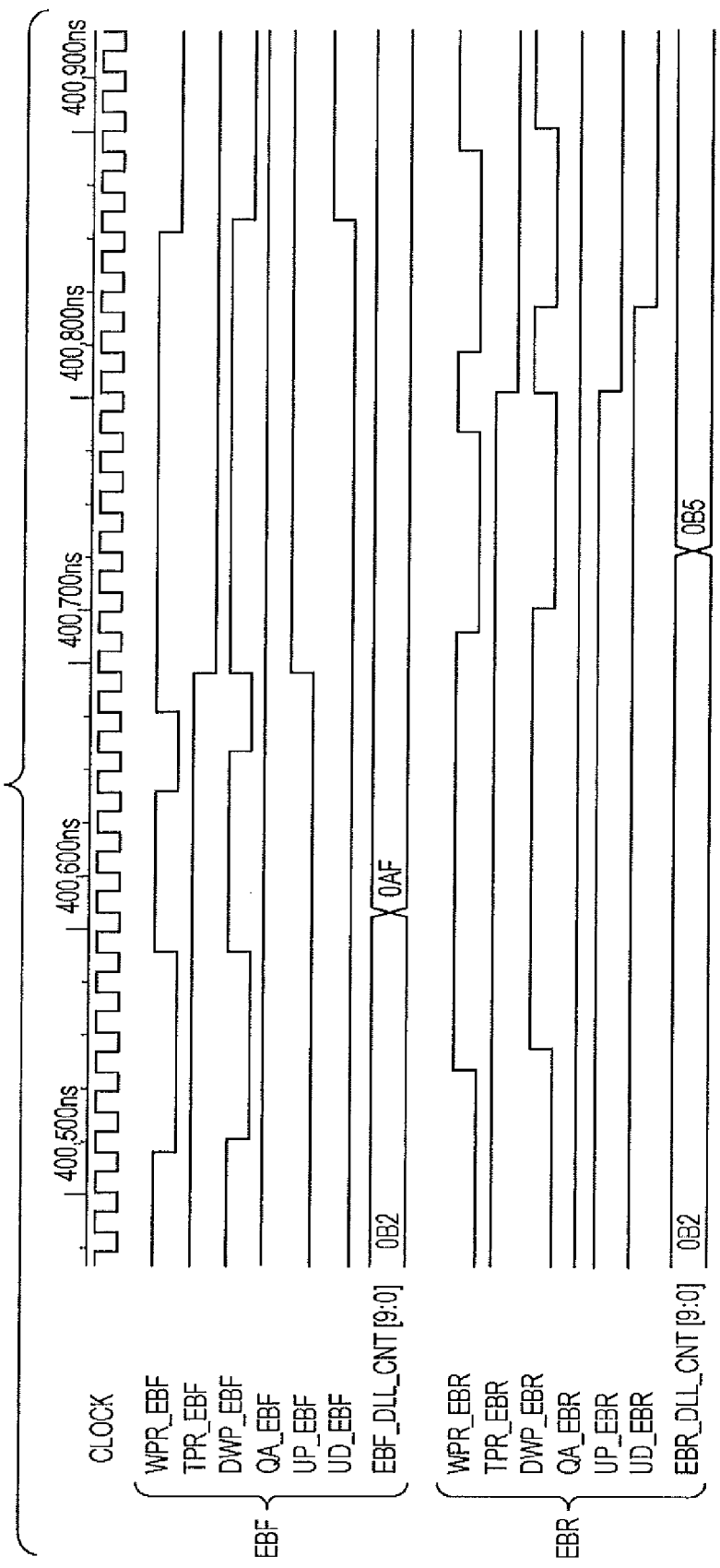
FIG. 17 is an explanatory diagram of an operation waveform of a unit delay determining unit according to an embodiment of the present disclosure.

In FIG. 17, an example in which the edge pulse WPR_EBF=H is satisfied in the calibration period is described.

After 2 T from the change of the test pulse to the mask signal MSK_MK=H, the test pulse is reversed after 4 T when counting from the edge of the edge pulse WPR_EBF, and returns to the original polarity in further 2 T.

In a case of FIG. 17, to use the rising edge when returning to the original polarity as for the calibration, the comparison pulse TPR_EBF is delayed by 2 T, when compared with FIG. 16, after 1 T from there, and then toggled. When all of the subsequent updating operations are delayed by 2 T, the same operations as those of EBF of FIG. 16 are obtained. Since the EBF is operated only at the time of the long run length, there is no problem in the processing delay of this level.

Figure 18:
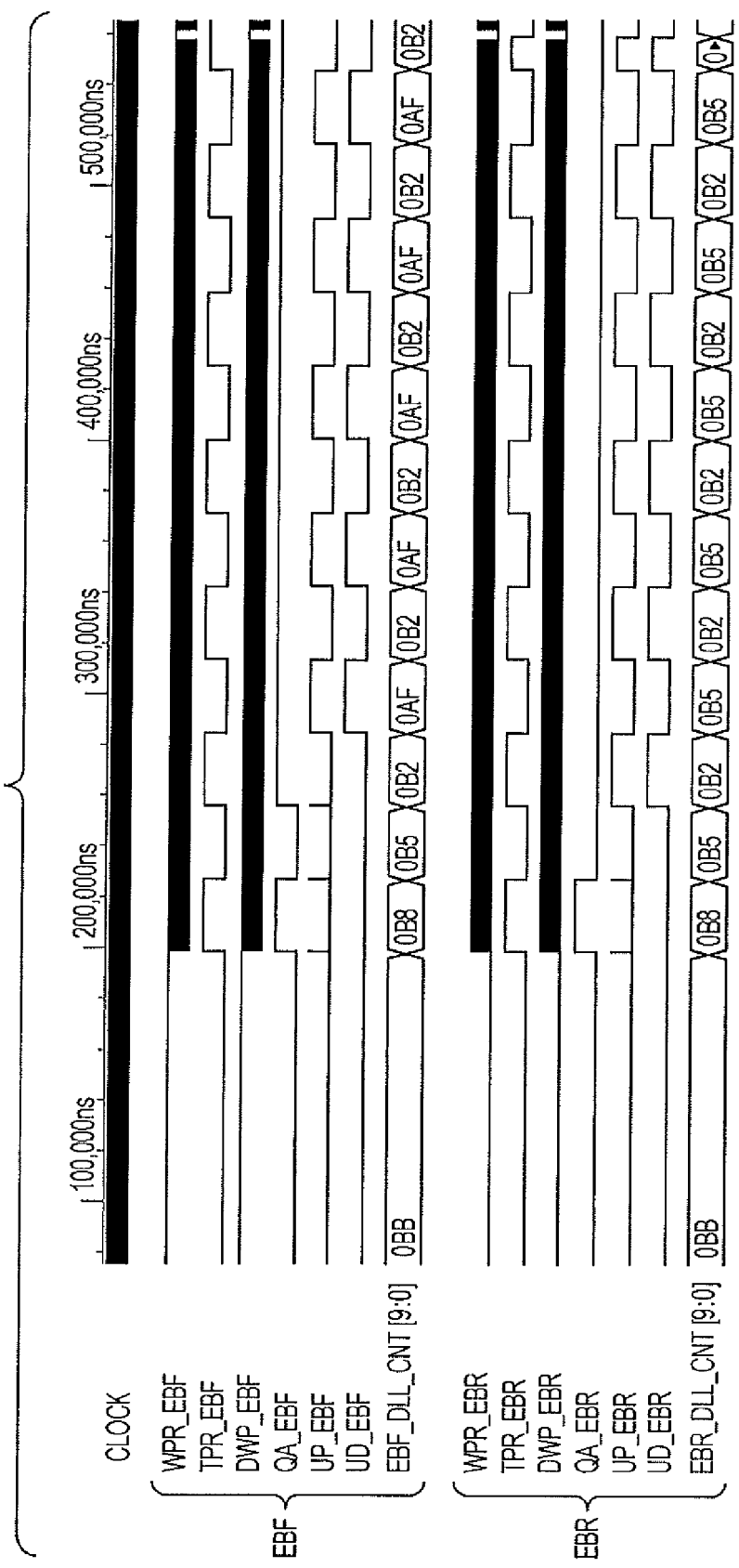
FIG. 18 is an explanatory diagram of an individual calibration according to an embodiment of the present disclosure.

Referring to FIG. 18, calibration individually performed by each of the unit delay determining units 38a and 38b with respect to EBF and EBR is shown.

Here, it is assumed that an initialization value of the number of reference delay stages EBF_DLL_CNT and EBR_DLL_CNT is BBh.

In this case, a count value as the number of reference delay stages EBF_DLL_CNT and EBR_DLL_CNT is first counted down by 3 for each frame sync. 3 being the counting unit is an example, and the counting unit may be determined as an optimized value in mounting.

In the vicinity of 300,000 ns, the number of reference delay stages EBR_DLL_CNT alternatively repeats B2h and B5h to lock.

In addition, in the vicinity of 450,000 ns, the number of reference delay stages EBF_DLL_CNT alternatively repeats AFh AND B2h to lock this.

Further, the initialization value of the number of reference delay stages EBF_DLL_CNT and EBR_DLL_CNT may be used, for example, when the delay line 33a for calibration is provided, however, this is not necessary.

This is because all of the delay lines 33a to 33g are able to be calibrated when the recording operation is not performed, and a convergence value as the initialization value may be calibrated frequently while recording.

In a case in which the disc driver apparatus performs calibration in a period during which the recording operation is not performed, for example, successive frame sync signals at regular intervals are input into the data pattern detector 31. Thus, it is possible to transit the up/down counter 41 to a locked state earlier than in the typical recording time. When suspending an output terminal of the light pulse generator 34, the outside is not affected.

Alternatively, by enabling the edge pulse generator and the like to have a test pulse generation function exclusive for calibration when non-recording, the test pulse may be successively generated when non-recording. Thus, in a period during which the recording operation is not performed, the unit delay determining units 38a to 38g are able to be swift enough to be locked.

As above, the first embodiment has been described, however, in the first embodiment, the variable delay circuit provides switching function to self-delay amount calibration function during the long run length when recording data, without performing pulse timing control on a part or all of the delay lines 33a to 33g.

Each of the delay lines 33a to 33g in which the delay elements are connected in series in a plurality of stages delays an input signal by the number of stages of the indicated delay element 80.

Each of the delay setting units 35, 36, and 37 set the number of delay stages of the corresponding delay lines 33a to 33g at the time other than the calibration period, based on the setting value of the number of delay stages DSTP_EBF to DSTP_MPF, that is, the calculation result obtained using the number of unit delay stages (the number of reference delay stages DREF_EBR to DREF_MPF) for delay of a predetermined unit delay amount (for example, 1 T) supplied as the unit delay control value, and using a delay time (delay amount data DLY_EBF to DLY_MPF) to be given to the corresponding edge pulse (WPR_EBF to WPR_MPF).

The light pulse generator 34 generates recording driving pulses (PP_TIM and EB_TIM) using each of the edge pulses (DWP_EBF to DWP_MPF) passing through each of the delay lines 33a to 33g.

In the calibration period, the edge pulse generator 32 overlaps the test pulse with the edge pulses (WPR_EBF and WPR_MPF), and generates each of the comparison pulses (TPR_EBF and TPR_MPF) having the unit delay amount (1 T) with respect to each of the test pulses.

Each of the unit delay determining units 38a to 38g give the unit delay control value (the number of reference delay stages EBF_DLL_CNT to MPF_DLL_CNT) to the corresponding delay setting units 35, 36, and 37 in the calibration period, and set 1 T delay to the corresponding delay lines 33a to 33g. Next, each of the unit delay determining units 38a to 38g determine the number of unit delay stages (the number of reference delay stages DREF_EBR to DREF_MPF) as the unit delay control value in the calibration period of the corresponding edge pulses (WPR_EBF to WPR_MPF) based on a value of the up/down counter in which a count value goes up or down in accordance with the phase comparison result between the test pulse and the comparison pulses (TPR_EBF to TPR_MPF), and supply the determined result to the corresponding delay setting units 35, 36, and 37.

In the present embodiment, an operation in which all of the plurality of delay lines 33a to 33g are accurately calibrated, which has been a difficult operation, is able to be performed, accuracy of the recording compensation circuit is enhanced, and stable recording characteristics and reliability of the apparatus are obtained.

In addition, in comparison with a multi-phase clocking scheme by analog PLL, costs are significantly reduced, and accuracy of the delay lines 33a to 33g of CMOS logic of the low power consumption is enhanced, so that a disc drive apparatus with low costs and low power consumption is able to be realized.

In addition, the delay line exclusive for calibration may not be provided, so that an increase in the circuit scale is suppressed. Further, in the configuration of FIG. 2 (see, FIG. 12) compared to the configuration of FIG. 8, it is necessary that the unit delay determining units 38a to 38g equivalent to each of the delay lines 33a to 33g are provided. However, in terms of mounting, the configuration of each of the unit delay determining units 38a to 38g has a significantly small scale compared to the delay lines. In comparison with the configuration of FIG. 8 as the result, reduction in the delay line 102 exclusive for calibration is highly advantageous as reduction in the circuit scale.

5. Second Embodiment

Figure 19:
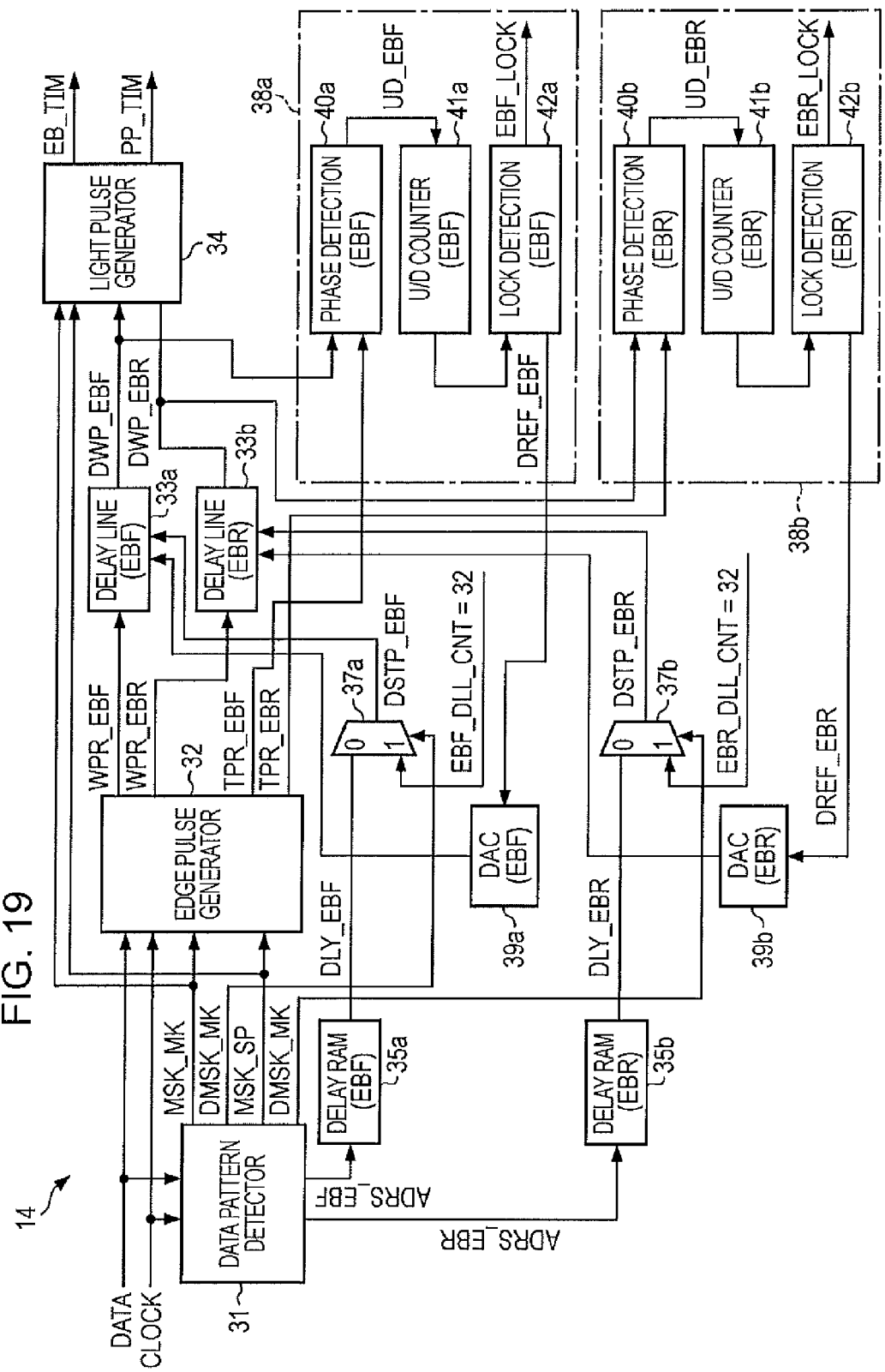
FIG. 19 is a block diagram of main parts of a write strategy unit according to a second embodiment of the present disclosure.

In FIG. 19, a configuration according to a second embodiment of the present disclosure is shown. A part (part equivalent to EBF and EBR) of the write strategy unit 14 is shown in the same manner as that of FIG. 12. However, a circuit system with respect to LPR, LPF, TPR, TPF, and MPF is also provided the same as that of FIG. 2, and these are the same as those of a circuit system of EBF and EBR of FIG. 19.

In FIG. 19, the same numeral references are applied to the same parts as those of FIG. 12, and the repeated descriptions will be omitted.

In the second embodiment of FIG. 19, a power supply voltage of the delay element 80 is controlled using the number of delay element stages of the delay lines 33 (33a to 33g) as the fixed number of stages such as 32, so that the variable delay circuit in which the delay amount of the delay element is controlled, and a desired delay amount is obtained is adapted.

Figure 20:
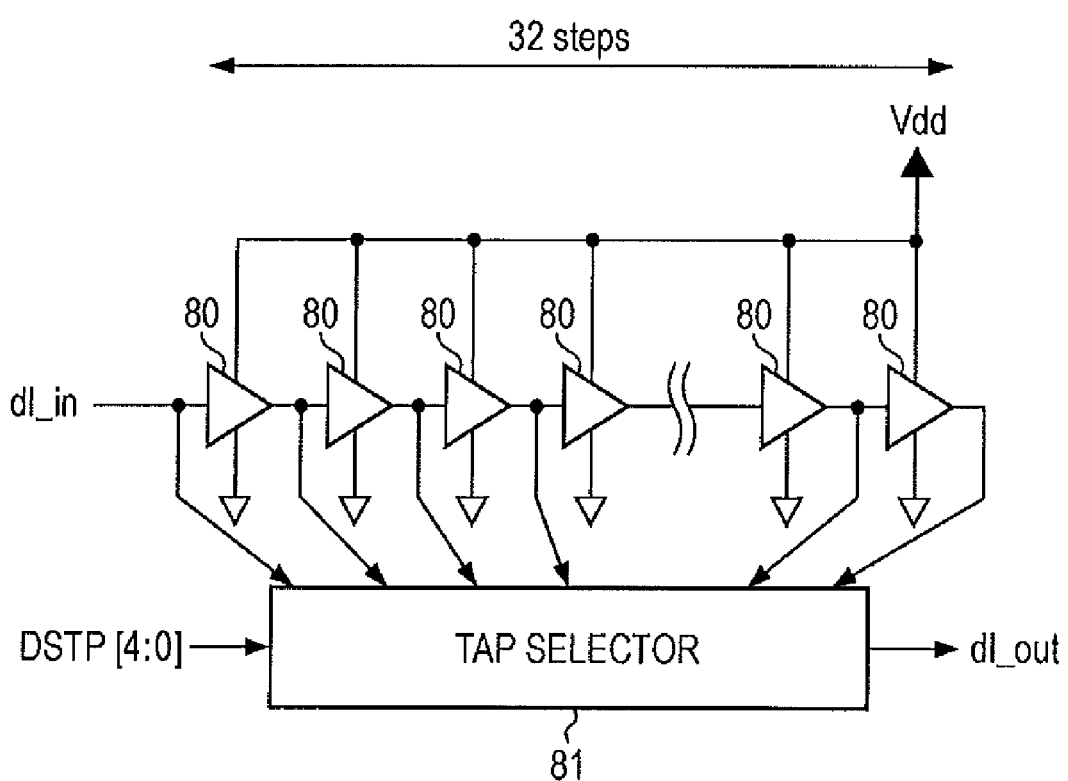
FIG. 20 is an explanatory diagram of a delay line according to a second embodiment of the present disclosure.

In FIG. 20, an example of the delay line 33 is shown. In this case, the delay elements 80 are connected in series, for example, in 32 stages. For example, the delay of 1 T is realized in 32 stages.

The tap selector 81 selects the output stage of the delay element 80 based on the supplied setting value of the number of delay stages DSTP (DSTP_EBF to DSTP_MPF). That is, the number of stages from input dl_in to output dl_out is designated, so that the delay amount less than 1 T is set.

The delay amount of each of the delay elements 80 is adjusted by the power supply voltage Vdd.

Further, an exit selection type is shown here, however, a configuration of the entrance selection type shown in FIG. 7A is possible.

In the delay lines 33a and 33b shown in FIG. 19, the delay amount of each of the delay elements 80 is adjusted by the control of the power supply voltage.

On the contrary, the following configuration is given.

As the delay setting unit with respect to the delay line 33, the multiplier 36 according to the first embodiment is not provided, and the delay RAM 35, the selector 37, and the D/A converter 39 are provided.

At the time other than the calibration period, the delay amount data DLY_EBF and DLY_EBR output from the delay RAMs 35a and 35b are provided, as they are, to the delay lines 33a and 33b through input 0 of the selectors 37a and 37b, as the setting value of the number of delay stages DSTP_EBF and DSTP_EBR.

Meanwhile, in the calibration period defined in the mask signals MSK_MK, DMSK_MK, MSK_SP, and DMSK_SP, the selectors 37a and 37b select a terminal 1. A fixed value of "32" is supplied to the input 1 of the selectors 37a and 37b as the number of reference delay stages EBF_DLL_CNT and EBR_DLL_CNT.

That is, the delay lines 33a and 33b shown in FIG. 20 are subjected to IT delay as delay of 32 stages.

Next, in the calibration period, a phase comparison between the test pulse delayed by 1 T and the comparison pulses TPR_EBF and TPR_EBR is performed in the unit delay determining units 38a and 38b, so that a count of the up/down counters 41a and 41b is controlled in accordance with the phase comparison result.

Lock determination of the count value of the up/down counter 41 is performed in the lock detection unit 42a and 42b, so that the unit delay control values (DREF_EBR and DREF_EBF) are output as the lock determination result.

"DREF_EBR" and "DREF_EBF" of this case signifies a power supply voltage value of each of the delay elements 80 for performing 1 T delay in 32 stages, rather than the "number of reference delay stages" indicating the number of stages of 1 T delay.

Each of the unit delay control values (DREF_EBR and DREF_EBF) is supplied to the D/A converters 39a and 39b, and further supplied to the delay lines 33a and 33b as analog voltage signals. The analog voltage signals correspond to the power supply voltage Vdd of FIG. 20, so that the delay amount of each of the delay elements 80 is calibrated.

In this calibration, when the delay amount after passing through, for example, 32 stages is larger than 1 T, the power supply voltage Vdd is increased to reduce the delay amount. That is, the count value of the up/down counters 41a and 41b is increased.

For this, a relation between the up/down indication signal UD of the up/down counters 41a and 41b and count up/down is set to be reversed to the case of the first embodiment, and the D/A converter in which correlation between an input digital value and an output voltage is negative is used as the D/A converters 39a and 39b.

In the second embodiment as described above, each of the delay lines 33a to 33g, in which the delay elements 80 are connected in series in a plurality of stages, delays an input signal by the number of stages of the delay elements 80.

The delay setting units 35, 37, and 39 set the power supply voltage Vdd of each of the delay elements 80 of the corresponding delay lines 33a to 33g based on the unit delay control values DREF_EBR and DREF_EBF.

In addition, the delay setting units 35, 37, and 39 set the number of delay stages of the corresponding delay lines 33a to 33g using the delay time (delay amount data DLY_EBF to DLY_MPF) to be given to the corresponding edge pulses WPR_EBF to WPR_MPF, as the setting value of the number of delay stages DSTP_EBF to DSTP_MPF.

Each of the unit delay determining units 38a to 38g determines the unit delay control values (DREF_EBR and DREF_EBF) for setting of the power supply voltage Vdd of the delay element 80, based on a value of the up/down counter in which a count value goes up and down in accordance with the phase comparison result, in the calibration period of the corresponding edge pulse to thereby be supplied to the corresponding delay setting unit 39.

Even in the above described second embodiment, the same effects as those of the first embodiment are able to be obtained.

6. Third Embodiment

In a third embodiment of the present disclosure, an example in which a configuration of the up/down counter 41 (41a to 41g) of the unit delay determining units 38a to 38g according to the first and second embodiments is different is given.

That is, the up/down counter 41 includes a sub-counter in which the count value goes up or down in accordance with the phase comparison result of the phase detector 40, and a main-counter in which the count value goes up or down to a setting maximum value and setting minimum value of the sub-counter.

Figure 21:
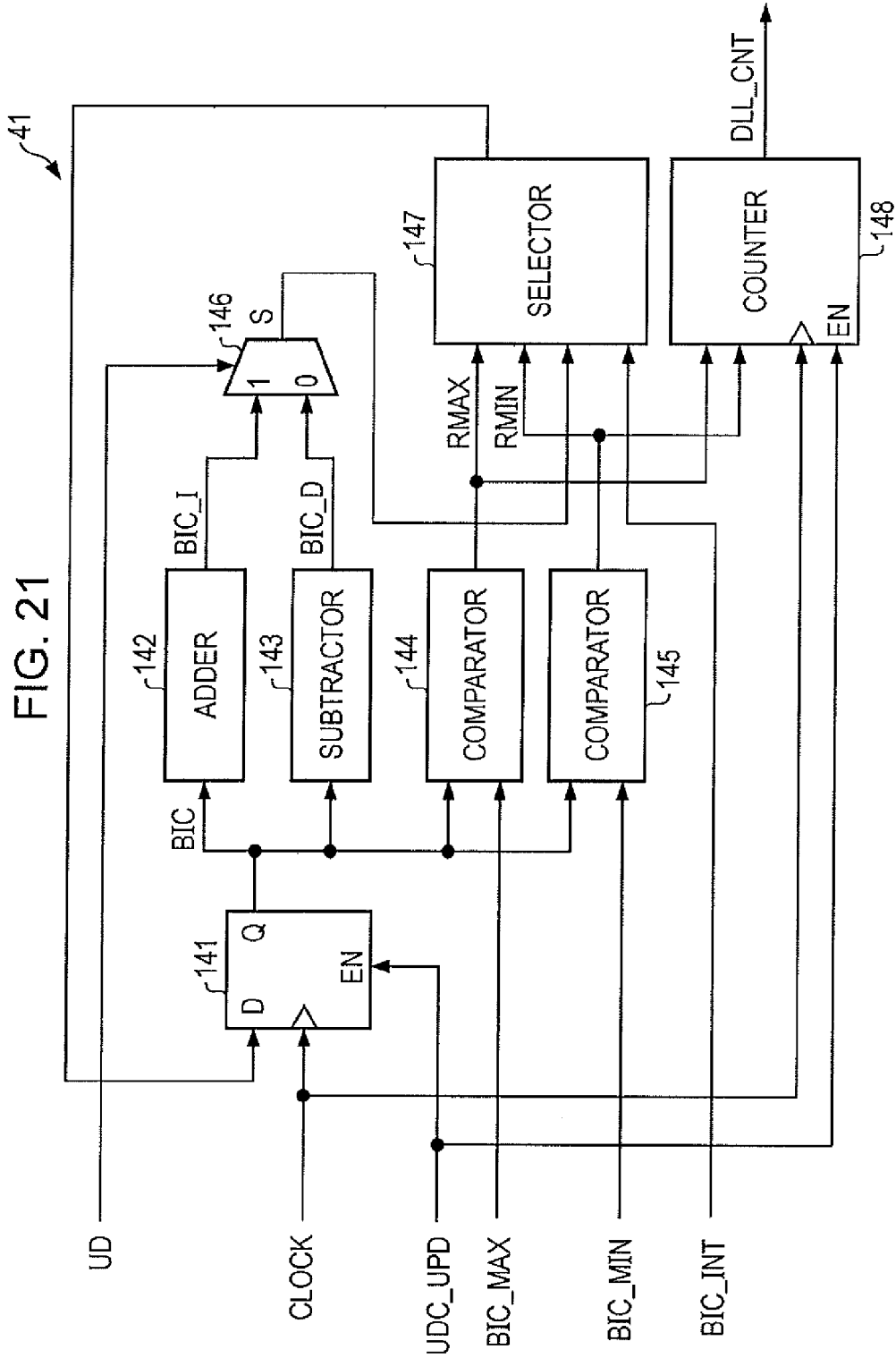
FIG. 21 is a block diagram of an up/down counter according to a third embodiment of the present disclosure.

In FIG. 21, a configuration example of the up/down counter 41 is given.

The up/down counter 41 shown in FIG. 21 includes a D-flip flop 141 for maintaining a current count value BIC, an addition circuit 142 for adding 1 to the count value BIC, and a subtraction circuit 143 for subtracting 1 from the count value BIC.

In addition, the up/down counter 41 further includes a comparison circuit 144 for comparing the count value BIC and the setting maximum value BIC-MAX, and outputting a reset signal RMAX in accordance with the compared result.

In addition, the up/down counter 41 further includes a comparison circuit 145 for comparing the count value BIC and the setting minimum value BIC-MIN, and outputting a reset signal RMIN in accordance with the compared result.

In addition, the up/down counter 41 further includes a selector 146 for outputting an input 1 or an input 2 as a selection output S in accordance with the input up/down indication signal UD.

In addition, the up/down counter 41 further includes a selector 147 for selecting the selection output S and a setting initialization value BIC-INT in accordance with the input reset signals RMAX and RMIN, and outputting the selected value to the D-flip flop 141, and a counter 148 for counting-up or counting-down the count value DLL_CNT in accordance with the reset signals RMAX and RMIN.

Here, the D-flip flop 141, the adder 142, the subtractor 143, the comparator 144, the comparator 145, and the selector 147 correspond to components as the above described sub-counter, and the counter 148 corresponds to the main-counter.

That is, in the up/down counter 41, the sub-counter is used so as to perform counting-down and counting-down of the count value DLL_CNT output by the counter 148 equivalent to the main-counter.

As for the count value BIC of the sub-counter, the setting maximum value BIC_MAX of the maximum value of the counting-up, the setting minimum value BIC-MIN of the minimum value of the counting-down, and an initialization value BIC-INT when counting-up and counting-down are arbitrarily set, respectively.

An update signal UDC_UPD is supplied to the counter 141 and 148, as an enabled signal.

The D-flip flop 141 latches a selection output from the selector 147 by a clock (Clock), and outputs the count value BIC with respect to the adder 142, the subtractor 143, and the comparators 144 and 145.

The selector 146 is supplied with count values BIC-I and BIC-D obtained by adding 1 and by subtracting 1 with respect to the count value BIC in the adder 142 and the subtractor 143. The count value BIC-I when the up/down indication signal UD from the phase detector 40 is a high level, and the count value BIC-D when the up/down indication signal UD is a low level are output to the selector 147, as the selection output S.

In addition, the comparators 144 and 145 output each of the reset signals RMAX and RMIN as the high level when the input count value BIC is identical to the setting maximum value BIC-MAX and the setting minimum value BIC-MIN.

In a case where one of the input reset signals RMAX and RMIN is the high level, the selector 147 selects the setting initialization value BIC-INT, and selects the selection output S from the selector 146 in other cases, so that the selected values are output, as the selection output BIC-0, to the D-flip flop 141.

Thus, the count value BIC is subjected to counting-up by repeatedly counting from the setting initialization value BIC-INT to the setting maximum value BIC-MAX, when the up/down indication signal U is the high level at the timing of rising edge of the clock (Clock). In addition, when the up/down indication signal UD is the low level, the count value BIC is subjected to counting-down by repeatedly counting from the setting initialization value BIC-INT to the setting minimum value BIC-MIN.

In addition, at the timing when the up/down indication signal UD is changed, the count value BIC has to be set to a value of the setting initialization value BIC-INT.

In addition, the count 148 counts-up the count value DLL_CNT when the reset signal RMAX from the comparator 144 is the high level at the timing of rising edge of the clock (Clock), and counts-down the count value DLL_CNT when the reset signal RMIN from the comparator 145 is the high level. Thus, when the count value BIC is counted-up by the setting initialization value BIC-INT to thereby be the setting maximum value BIC-MAX, the counting-up of the count value DLL_CNT is performed, and when the count value BIC is counted-down by the setting initialization value BIC-INT to thereby be the setting minimum value BIC-MIN, the counting-down of the count value DLL_CNT is performed.

By the above described up/down counter 41, the following effects are obtained.

In the timing comparison in the phase detector 40 (40a to 40g) of the unit delay determining unit 38 (38a to 38g), first arrival determining between the comparison pulse (TPR_EBF to TPR_MPF) by the D-flip flop 110 of FIG. 11B and the test pulse is performed.

Here, when the rising edge of the test pulse being the clock input and the reversion of the comparison pulse (TPR_EBF to TPR_MPF) being the D input are input over a time period shorter than a minimum setup time and a hold time of the D-flip flop 110, a signal QA being the output phase comparison intermediate signal is not determined, and short-term disturbance occurs in the up/down indication signal UD output from the phase detector 40.

Accordingly, the count value of the up/down counter counted based on the up/down indication signal UD is irregularly changed, so that the count value of the up/down counter 41 is unstably changed with a size of ± the number of stages while a value of the number of reference delay stages DREF is not locked.

On the other hand, the up/down counter 41 passes the up/down indication signal UD output from the phase detector 40 through a non-linear counter (the above sub-counter) for performing the same operation as that of a loss-pass filter, and then is subjected to a counting-up and counting-down operation, so that the above described unstable change is prevented from occurring.

Thus, it is possible to realize a more stable count value of the up/down counter 41 that is the unit delay control value.

7. Fourth Embodiment

In a fourth embodiment of the present disclosure, another configuration example is given as the up/down counter 41 having the above described sub-counter.

Figure 22:
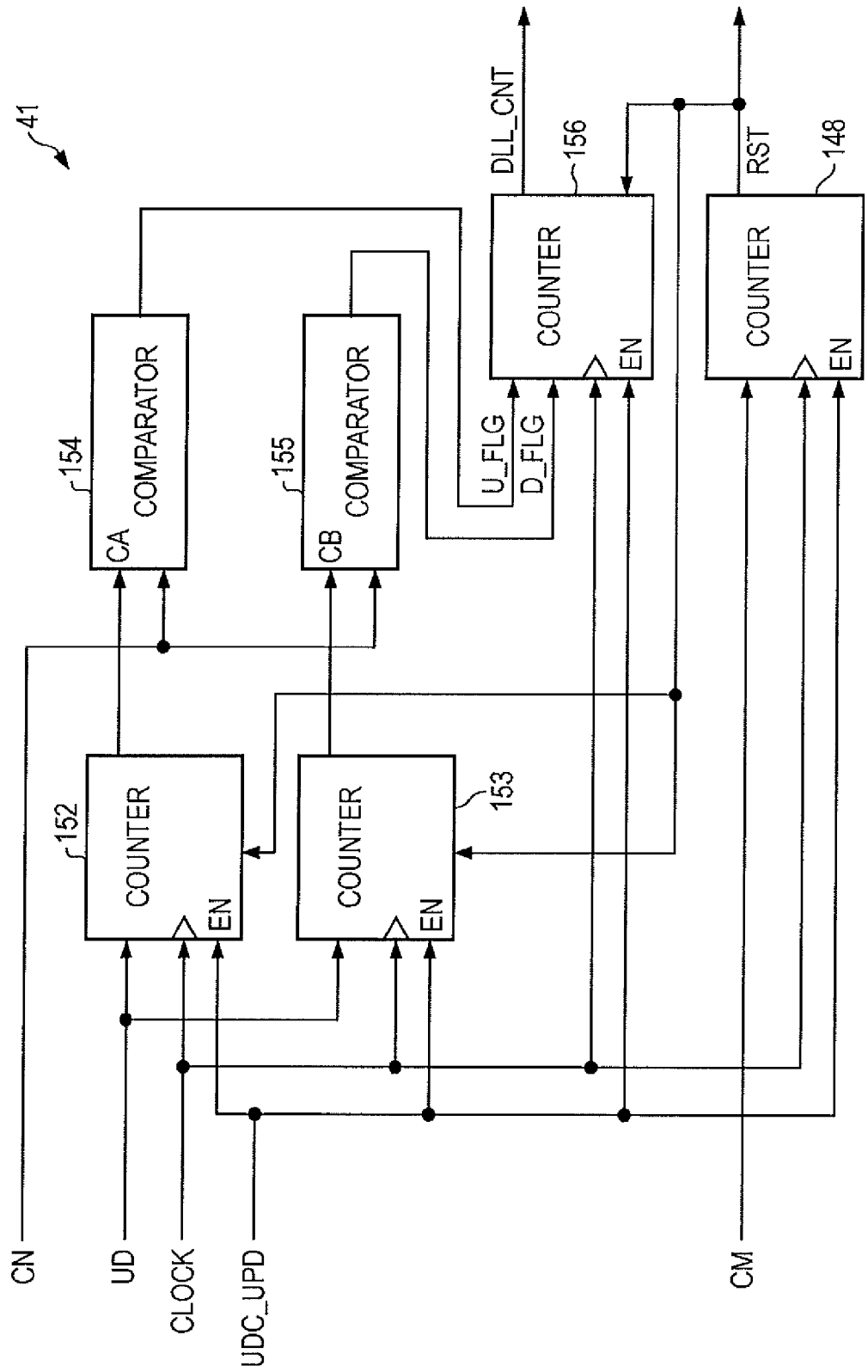
FIG. 22 is a block diagram of an up/down counter according to a fourth embodiment of the present disclosure.

FIG. 22 shows a configuration example of the up/down counter 41.

The up/down counter 41 of FIG. 22 includes a counter 151 for repeatedly counting-up the count value until the count value reaches a predetermined value, and counters 152 and 153 for each performing counting-up based on the stage of the high level or the low level of the up/down indication signal UD output from the phase detector 40.

In addition, when each count value CA and CB from the counters 152 and 153 reach a predetermined value, the up/down counter 41 further includes comparators 154 and 155 for enabling output flag signals U-FLG and D-FLG to be a high level.

In addition, the up/down counter 41 further includes a counter 156 for outputting the count value DLL_CNT counted-up and counted-down based on the flag signals U-FLG and D-FLG.

A setting value CM as a maximum value of the counter value is arbitrarily given in advance to the counter 151, and the counter 151 performs counting-up at the timing of rising edge of the clock (Clock). When the count value reaches the setting value CM, the counter 151 outputs a rest signal RST at the timing of next rising edge of clock (Clock), and performs counting starting from 0 by resetting the count value. Thus, the counter 151 outputs the reset signal RST at regular intervals.

The up/down indication signal UD is supplied to the counters 152 and 153. When the up/down indication signal UD is the high level, the counter 152 performs counting-up the count value CA at the timing of rising edge of clock (Clock), and when the up/down indication signal UD is the low level, the counter 152 maintains the count value CA.

When the reset signal RST is input by the counter 151, the count value CA is reset at the timing of rising edge of clock (Clock).

Meanwhile, when the up/down indication signal UD is the low level, the counter 153 performs counting-up of the count value CB at the timing of rising edge of clock (Clock), and when the up/down indication signal UD is the high level, the counter 153 maintains the count value CB. In addition, when the reset signal RST is input from the counter 151, the count value CB is reset at the timing of rising edge of clock (Clock).

An arbitrary setting value CN is given in advance to the comparators 154 and 155.

When the count value CA by the counter 152 is more than the setting value CN, the comparator 154 enables the output flag signal U-FLG to be the high level.

When the count value CB by the counter 153 is more than the setting value CN, the comparator 155 enables the output flag signal D-FLG to be the high level.

The counter 156 detects a state of each of the flag signals U-FLG and D-FLG at the timing when the reset signal RST is input from the counter 151. Next, when the flag signal U-FLG is the high level, counting-up of the count value DLL_CNT is performed at the timing of next rising edge of clock (Clock), and when the flag signal D-FLG is the high level, counting-down of the count value DLL_CNT is performed at the timing of next rising edge of clock (Clock).

In the up/down counter 41, the counting-up and counting-down of the count value DLL_CNT of the counter 156 are performed only when the number of times the up/down indication signal UD is either the high level or the low level reaches the setting value CN at the timing of rising edge of clock (Clock) within a regular time period during which the reset signal RST is output. When the number of times of each of the high level or the low level of the up/down indication signal UD is relatively small, the count value DLL_CNT is not changed. Thus, noise components of a high frequency included in the up/down indication signal UD are ignorable, so that the count value DLL_CNT is accurately and stably output.

8. Modified Example

As above, the embodiments of the present disclosure have been described, however, a modified example of the present disclosure is variously considered.

In the above embodiments, the calibration period has been described limiting the frame sync signal existing on a format of the recording data (Data), however, increasing an insertion frequency of the test pulse by reducing the detected long run length up to a length existing within a modulation rule is also effective.

The reduced limitation in the long run length is determined by a timing limitation between switching of the number of stages of the delay lines 33a to 33g and the pulse edge, and an appropriate value of the long run length may be determined in mounting.

In addition, in the configuration of FIG. 2 (FIG. 12) and FIG. 19, the DLL circuit 100 exclusive for calibration may be provided. In this case, the count value (the number of reference delay stages, or DLL_CNT as the power supply voltage of the delay element) as the unit delay control value obtained from the configuration operation by the DLL circuit 100 may be used as an initialization value or reference value of the count of the up/down counters 41a to 41g in each of the unit delay determining units 38a to 38g.

In the above embodiments, the disc drive apparatus with respect to the optical disc is given as an example, however, the present disclosure may be applied even to an optical recording medium, or to a recording device with respect to a magnetic recoding medium of the disc-type or the other types other than the disc. In particular, the variable delay circuit of the present disclosure is widely applied to various fields as the variable delay circuit having a function of calibrating the delay line.

It should be understood by those skilled in the art that various modifications, combinations, sub-combinations and alterations may occur depending on design requirements and other factors insofar as they are within the scope of the appended claims or the equivalents thereof.

What is claimed is:

1. A variable delay circuit, comprising:
   a delay line in which a delay amount is variably set;
   a delay setting unit that performs a delay setting of the delay line using a unit delay control value for executing delay of the delay amount to be given for an input signal to the delay line and delay of a predetermined unit delay amount in the delay line;
   a pulse generator that, in a calibration period, overlaps a test pulse with the input signal, and generates a comparison pulse having the unit delay amount with respect to the test pulse; and
   a unit delay determining unit that sets the delay of the unit delay amount in the delay line by providing the unit delay control value to the delay setting unit in the calibration period, determines the unit delay control value equivalent to the unit delay amount based on a phase comparison result between the comparison pulse and the test pulse in which the unit delay amount is applied through the delay line, and provides, to the delay setting unit, the determined unit delay control value as the unit delay control value of a calibration result.

2. The variable delay circuit according to claim 1, wherein the unit delay determining unit determines the unit delay control value based on a value of an up/down counter in which a count value goes up or down in accordance with the phase comparison result.

3. The variable delay circuit according to claim 2, wherein:
   the delay line in which delay elements are connected in series in a plurality of stages delays the input signal by the number of the stages of the delay element provided in the delay setting unit,
   the delay setting unit sets the number of delay stages of the delay line at the time other than the calibration period based on a calculation result obtained using the number of unit delay stages for the delay of the predetermined unit delay amount provided as the unit delay control value, and also using the delay amount to be given for the input signal, and
   the unit delay determining unit determines the number of unit delay stages as the unit delay control value based on the value of the up/down counter in which the count value goes up or down in accordance with the phase comparison result, and provides the determined number of the unit delay stages to the delay setting unit.

4. The variable delay circuit according to claim 2, wherein:
   the delay line in which delay elements are connected in series in a plurality of stages delays the input signal by the number of the stages of the delay element provided in the delay setting unit,
   the delay setting unit performs setting of a power supply voltage of the delay element based on the unit delay control value, and setting of the number of the delay stages of the delay line in accordance with a delay amount to be given for the input signal, and the unit delay determining unit determines the unit delay control value for the setting of the power supply voltage of the delay element based on the value of the up/down counter in which the count value goes up or down in accordance with the phase comparison result, and provides the determined unit delay control value to the delay setting unit.

5. The variable delay circuit according to claim 2, wherein the up/down counter includes a sub-counter in which the count value goes up or down in accordance with the phase comparison result, and a main counter in which the count value goes up or down to a setting maximum value and a setting minimum value of the sub-counter.

6. A recording apparatus, comprising:
a head unit that performs information recording by performing a recording operation depending on a recording driving pulse with respect to a recording medium; and
a recording driving pulse generation unit that generates the recording driving pulse based on recording data,
wherein the recording driving pulse generation unit includes
an edge pulse generator that outputs one or a plurality of edge pluses indicating one or a plurality of edge timings to be a timing adjustment target when the recording driving pulse depending on the recording data is generated, overlaps a test pulse with the edge pulse in the calibration period with respect to each of the edge pulses, and generates a comparison pulse having a unit delay amount with respect to each test pulse,
a plurality of delay lines that are installed to correspond to each of the edge pulses, each of the delay lines variably setting a delay amount to be given to an input edge pulse;
a plurality of delay setting units that are installed to correspond to each of the delay lines, and performs a delay setting with respect to a corresponding delay line using a unit delay control value for performing delay of the delay amount to be given to the input edge pulse and delay of a predetermined unit delay amount to the corresponding delay line,
a light pulse generator that generates the recording driving pulse using each of the edge pulses having passed through each of the delay lines, and
a plurality of unit delay determining units that are installed to correspond to each of the delay lines, each of the unit delay determining units setting the delay of the unit delay amount to the corresponding delay line by giving the unit delay control value to a corresponding delay setting unit in the calibration period, determining the unit delay control value equivalent to the unit delay amount based on a phase comparison result between the comparison pulse and the test pulse in which the unit delay amount is applied through a corresponding delay line, and supplying, to the corresponding delay setting unit, the determined unit delay control value as the unit delay control value of a calibration result.

7. The recording apparatus according to claim 6, wherein each of the unit delay determining units determines the unit delay control value based on a value of an up/down counter in which a count value goes up or down in accordance with the phase comparison result.

8. The recording apparatus according to claim 7, wherein:
each of the delay lines in which delay elements are connected in series in a plurality of stages delays an input signal by the number of stages of the delay element set in each of the delay setting units,
each of the delay setting units sets the number of delay stages of a corresponding delay line at the time other than the calibration period based on a calculation result obtained using the number of unit delay stages for the delay of the predetermined unit delay amount provided as the unit delay control value, and also using the delay amount to be given to a corresponding edge pulse, and
each of the unit delay determining units determines the number of unit delay stages as the unit delay control value based on the value of the up/down counter in which the count value goes up or down in accordance with the phase comparison result, and provides the determined number of the unit delay stages to a corresponding delay setting unit.

9. The recording apparatus according to claim 7, wherein:
each of the delay lines in which delay elements are connected in series in a plurality of stages delays an input signal by the number of stages of the delay element set in each of the delay setting units,
each of the delay setting units performs setting of a power supply voltage of the delay element of a corresponding delay line based on the unit delay control value, and setting of the number of delay stages of a corresponding delay line in accordance with the delay amount to be given to a corresponding edge pulse, and
each of the unit delay determining units determines the unit delay control value for the setting of the power supply voltage of the delay element based on the value of the up/down counter in which the count value goes up or down in accordance with the phase comparison result, and provides the determined unit delay control value to a corresponding delay setting unit.

10. The recording apparatus according to claim 7, wherein the up/down counter includes a sub-counter in which the count value goes up or down in accordance with the phase comparison result, and a main counter in which the count value goes up or down to a setting maximum value and a setting minimum value of the sub-counter.

11. The recording apparatus according to claim 6, wherein:
the head unit is an optical pickup unit, and performs the information recording by performing the recording operation with respect to an optical recording medium as a laser output in accordance with the recording driving pulse, and
the recording driving pulse generation unit generates a laser driving pulse as the recording driving pulse based on the recording data.

12. The recording apparatus according to claim 6, wherein:
the recording data is the recording data as a run length limited code,
the recording apparatus further includes a mask signal generation unit that generates a mask signal so that a period during which a run length of the recording data becomes a prescribed length or longer is the calibration period, and
the edge pulse generator overlaps the test pulse with the edge pulse in accordance with the mask signal to thereby output the overlapped edge pulse.

13. The recording apparatus according to claim 12, wherein, in the calibration period in accordance with the mask signal, a test pulse removal circuit for removing the test pulse from the edge pulse input through the delay line is provided in the light pulse generator.

14. A delay amount calibration method in a variable delay circuit that sets a delay amount of a delay line using a unit delay control value for executing delay of the delay amount to be given for an input signal to the delay line in which the delay amount is variably set, and delay of a predetermined unit delay amount in the delay line, the method comprising:

overlapping a test pulse with the input signal in a calibration period after setting the delay of the unit delay amount in the delay line based on the unit delay control value, and generating a comparison pulse having the unit delay amount with respect to the test pulse;

performing a phase comparison between the comparison pulse and the test pulse in which the unit delay amount is applied through the delay line; and determining the unit delay control value equivalent to the unit delay amount based on a result of the phase comparison, and enabling the determined unit delay control value as the unit delay control value of a calibration result to be used in subsequent setting of the delay amount of the delay line.

* * * * *